(12) United States Patent
Adachi et al.

(10) Patent No.: US 12,242,540 B2
(45) Date of Patent: Mar. 4, 2025

(54) DATA PROCESSING APPARATUS, DATA PROCESSING SYSTEM, AND DATA PROCESSING METHOD

(71) Applicants: Shinichi Adachi, Kanagawa (JP); Kei Kawashima, Tokyo (JP); Taku Nagumo, Kanagawa (JP)

(72) Inventors: Shinichi Adachi, Kanagawa (JP); Kei Kawashima, Tokyo (JP); Taku Nagumo, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 149 days.

(21) Appl. No.: 17/658,123

(22) Filed: Apr. 6, 2022

(65) Prior Publication Data

US 2022/0335087 A1 Oct. 20, 2022

(30) Foreign Application Priority Data

Apr. 14, 2021 (JP) .................................. 2021-068469
Mar. 28, 2022 (JP) .................................. 2022-052401

(51) Int. Cl.
*G06F 16/9038* (2019.01)
*G06F 3/0482* (2013.01)
*G06F 16/906* (2019.01)
*G06V 30/414* (2022.01)
*G10L 15/26* (2006.01)

(52) U.S. Cl.
CPC ........ *G06F 16/9038* (2019.01); *G06F 3/0482* (2013.01); *G06F 16/906* (2019.01); *G06V 30/414* (2022.01); *G10L 15/26* (2013.01)

(58) Field of Classification Search
None
See application file for complete search history.

(56) References Cited

U.S. PATENT DOCUMENTS

| | | | |
|---|---|---|---|
| 2016/0255139 A1* | 9/2016 | Rathod | H04N 1/32101 709/203 |
| 2017/0011171 A1* | 1/2017 | Murakami | G16H 10/60 |
| 2019/0057100 A1* | 2/2019 | Burghoffer | G06F 16/148 |
| 2020/0035248 A1* | 1/2020 | Torfs | G01S 5/0045 |
| 2020/0042726 A1* | 2/2020 | Lawrenson | G06Q 50/01 |
| 2020/0374391 A1* | 11/2020 | Murgrabia | H04M 1/27475 |
| 2021/0193167 A1* | 6/2021 | Jiang | G10L 25/51 |
| 2021/0341989 A1* | 11/2021 | Chen | G06F 3/017 |
| 2023/0308444 A1* | 9/2023 | Arai | H04L 12/2854 726/4 |

FOREIGN PATENT DOCUMENTS

| | | |
|---|---|---|
| JP | 2002-055985 | 2/2002 |
| JP | 2015-060263 | 3/2015 |

\* cited by examiner

*Primary Examiner* — Thu N Nguyen
(74) *Attorney, Agent, or Firm* — IPUSA, PLLC

(57) ABSTRACT

A data processing apparatus includes circuitry. The circuitry acquires data. The circuitry identifies a type of the data based on text information of the data, the text information being one of text information included in the data and text information converted from the data. The circuitry executes one or more processes on the data according to the identified type to obtain one or more pieces of processed data. The circuitry performs control to output the one or more pieces of processed data, as one or more processing results.

19 Claims, 17 Drawing Sheets

FIG. 6

| DATA NUMBER | USER ID |
|---|---|
| 10523 | 0012342 |
| 10524 | 0017108 |
| ... | ... |
| ... | ... |

FIG. 7

| TYPE OF DATA | EXTRACTION CONTENT |
|---|---|
| INVOICE | AMOUNT, ADDRESS, PAYMENT DUE,⋯ |
| CONTRACT | CONTRACT CONTENT, COUNTERPARTY, TERM,⋯ |
| TECHNICAL DOCUMENTATION | ABSTRACT, TECHNICAL FIELD |
| ... | ... |

FIG. 8

| DATA NUMBER | USER ID | TYPE OF DATA | AMOUNT | ADDRESS |
|---|---|---|---|---|
| 10523 | 0012342 | INVOICE | ¥50,000 | XX CORPORATION |
| 10524 | 0017108 | INVOICE | ¥3,000 | YY CORPORATION |
| ... | ... | | | |
| ... | ... | | | |

FIG. 9

| TYPE OF DATA | SOFTWARE |
|---|---|
| INVOICE | A |
| CONTRACT | B,C |
| ... | ... |
| ... | ... |

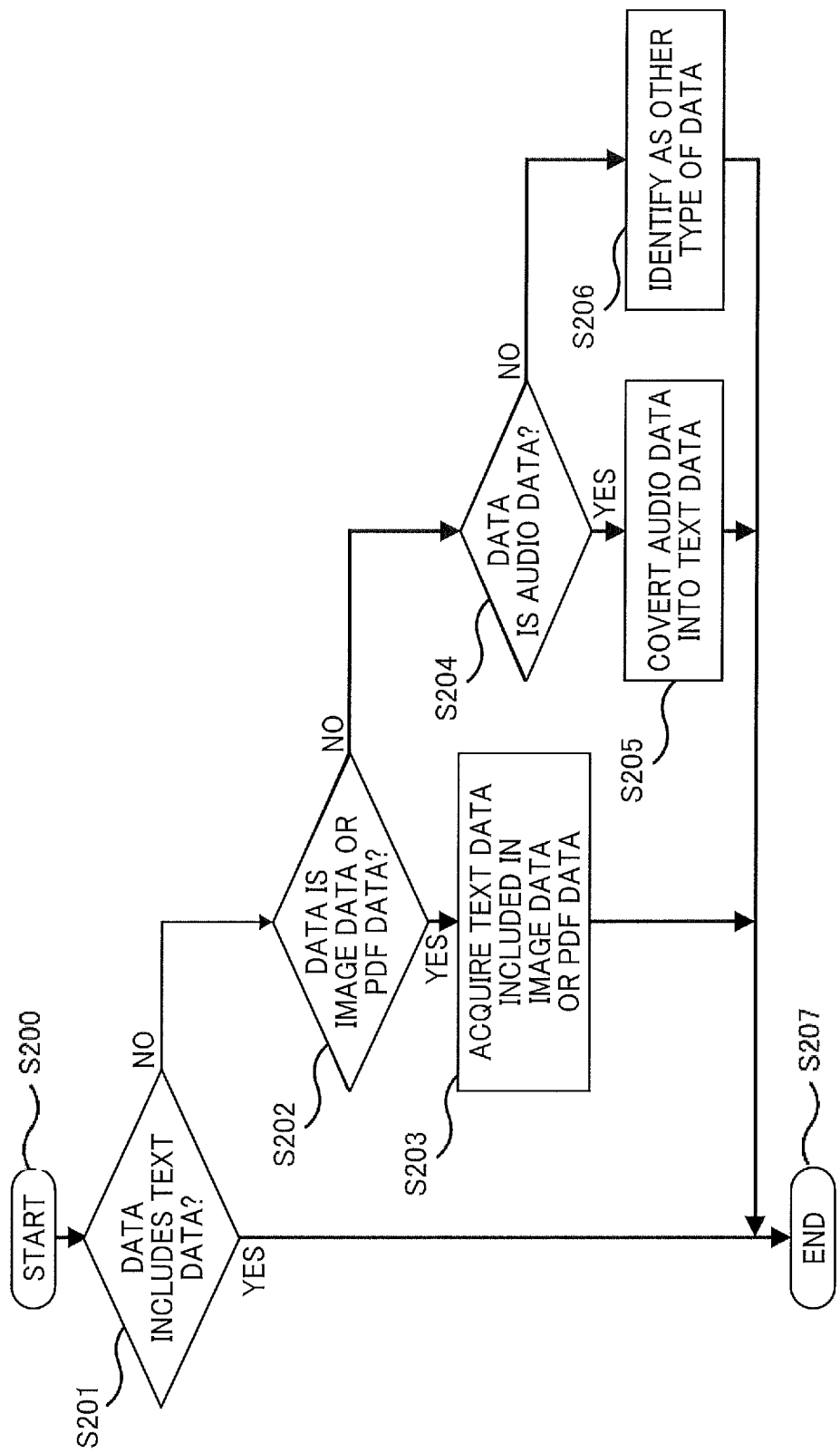

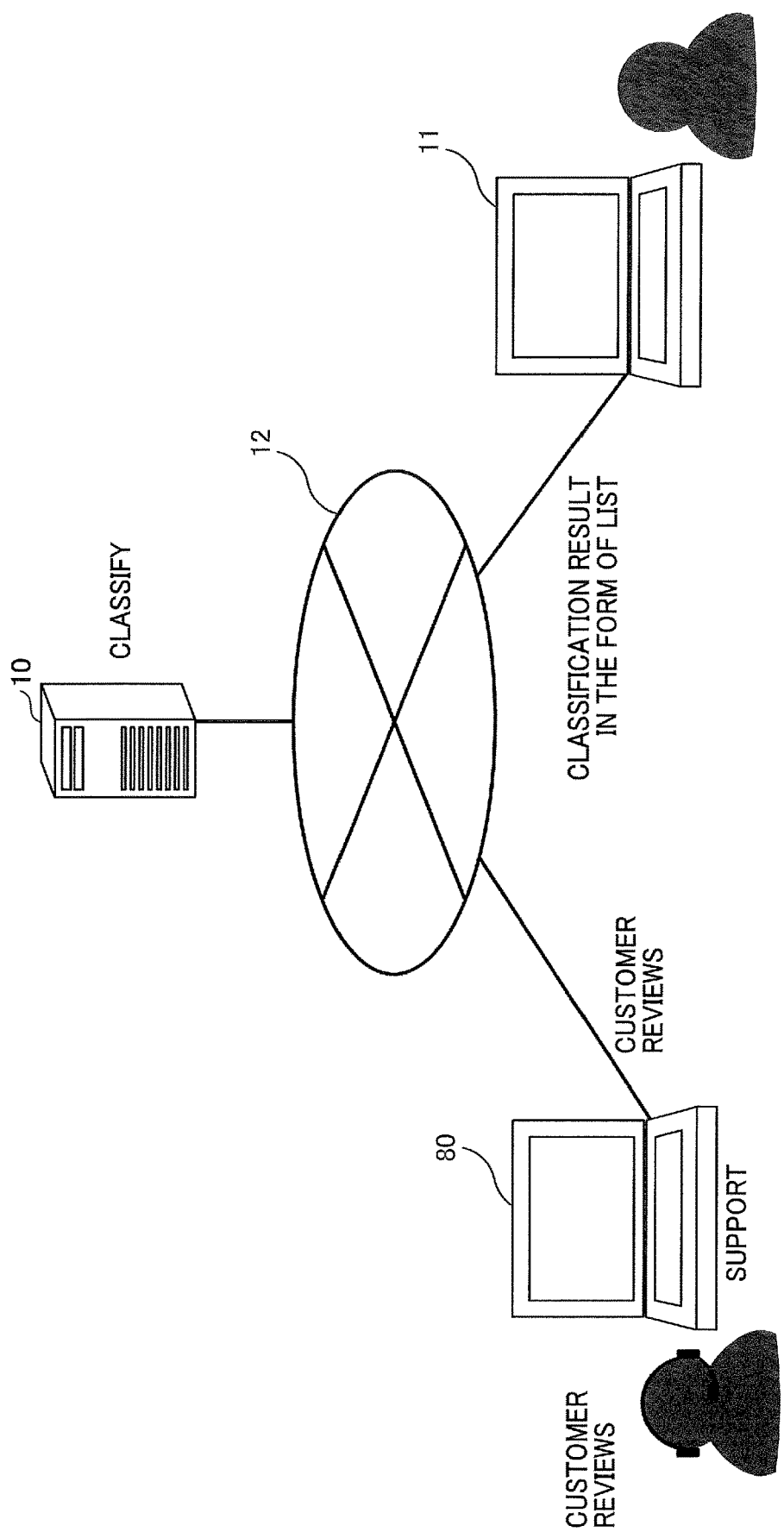

FIG. 18

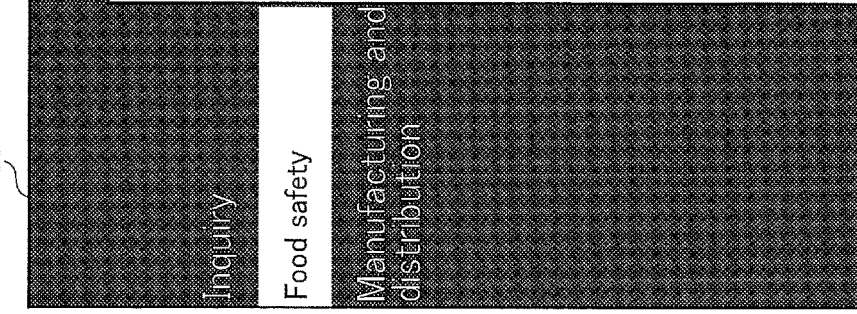

| Number | Content | Analysis Date | Category | Accuracy | Importance |
|---|---|---|---|---|---|
| 0087 | I drank the healthy tea I watched on TV commercials and had diarrhea. I consulted with my family doctor and stopped ... | 2021/10/9 | Digestive symptoms | 0.99 | 3 |
| 0094 | I ordered beer online. When I lifted the box, the box broke and the flooring was scratched ... | 2021/10/9 | No health damage | 0.13 | 1 |
| 0127 | When I ate the dumplings I bought at the Japanese sweets shop, it tasted strange. After that, I had diarrhea and vomiting ... | 2021/10/9 | Digestive symptoms | 0.99 | 3 |
| 0133 | When my son ate French fries of frozen food, they contain a small piece of wood and his gums were ... | 2021/10/9 | Oral and throat symptoms | 0.99 | 2 |
| 0136 | When I ate hamburger steak of frozen food, it contained metal pieces and my back tooth was broken. Today, the manufacturer ... | 2021/10/9 | Oral and throat symptoms | 0.99 | 2 |

DATA PROCESSING APPARATUS, DATA PROCESSING SYSTEM, AND DATA PROCESSING METHOD

CROSS-REFERENCE TO RELATED APPLICATIONS

This patent application is based on and claims priority pursuant to 35 U.S.C. § 119(a) to Japanese Patent Application Nos. 2021-068469, filed on Apr. 14, 2021, and 2022-052401, filed on Mar. 28, 2022, in the Japan Patent Office, the entire disclosures of which are hereby incorporated by reference herein.

BACKGROUND

Technical Field

Embodiments of the present disclosure relate to a data processing apparatus, a data processing system, and a data processing method.

Related Art

For data management, attribute information is added to data such as text data, audio data, image data, and video data accumulated by a company or the like. Examples of the attribute information include a data name, a data type, a creator name, a creation date and time, and an update date and time.

However, a computer cannot identify attribute information of data obtained by scanning a paper document such as invoices or contracts by a scanner even if the attribute information is printed on the paper document. For this reason, a user checks the attribute information for data classification. This puts heavy work load on the user.

To address such as issue, a technology has been proposed that creates a document attribute extraction sheet in which a type of attribute to be extracted and a description position identifier (ID) are set. A paper document is scanned with the document attribute extraction sheet as a cover. With this configuration, an attribute is extracted from the scanned paper document, and the extracted attribute is assigned.

SUMMARY

An embodiment of the present disclosure includes a data processing apparatus including circuitry. The circuitry acquires data. The circuitry identifies a type of the data based on text information of the data, the text information being one of text information included in the data and text information converted from the data. The circuitry executes one or more processes on the data according to the identified type to obtain one or more pieces of processed data. The circuitry performs control to output the one or more pieces of processed data, as one or more processing results.

Another embodiment of the present disclosure includes a data processing system including a data processing apparatus and an operation device. The data processing apparatus includes circuitry. The circuitry acquires data. The circuitry identifies a type of the data based on text information of the data, the text information being one of text information included in the data and text information converted from the data. The circuitry executes one or more processes on the data according to the identified type to obtain one or more pieces of processed data. The circuitry performs control to output the one or more pieces of processed data, as one or more processing results.

Another embodiment of the present disclosure includes a method of processing data by a data processing apparatus. The method includes acquiring data. The method includes identifying a type of the data based on text information of the data, the text information being one of text information included in the data and text information converted from the data. The method includes executing one or more processes on the data according to the identified type to obtain one or more pieces of processed data. The method includes performing control to output the one or more pieces of processed data, as one or more processing results.

BRIEF DESCRIPTION I/F THE DRAWINGS

A more complete appreciation of the disclosure and many of the attendant advantages and features thereof can be readily obtained and understood from the following detailed description with reference to the accompanying drawings, wherein:

FIG. 6 is an example of a table storing a data number in association with a user identification, according to an embodiment of the present disclosure;

FIG. 7 is an example of a table associating an extraction content to be extracted from data with a type of data, according to an embodiment of the present disclosure;

FIG. 8 is an example of a table in which data is tagged with an identified type of data and extracted contents, according to an embodiment of the present disclosure;

FIG. 9 is an example of a table in which software to be executed is set in association with a type of data, according to an embodiment of the present disclosure;

FIG. 10 is a flowchart illustrating an example of a process of converting data into text data, according to an embodiment of the present disclosure;

FIG. 17 is a schematic diagram illustrating an overview of a quality analysis service in food industry using a data processing system, according to an embodiment of the present disclosure;

FIG. 18 is a diagram illustrating an example of a screen on which a classification result is displayed at an operation device, according to an embodiment of the present disclosure.

Figure 1:
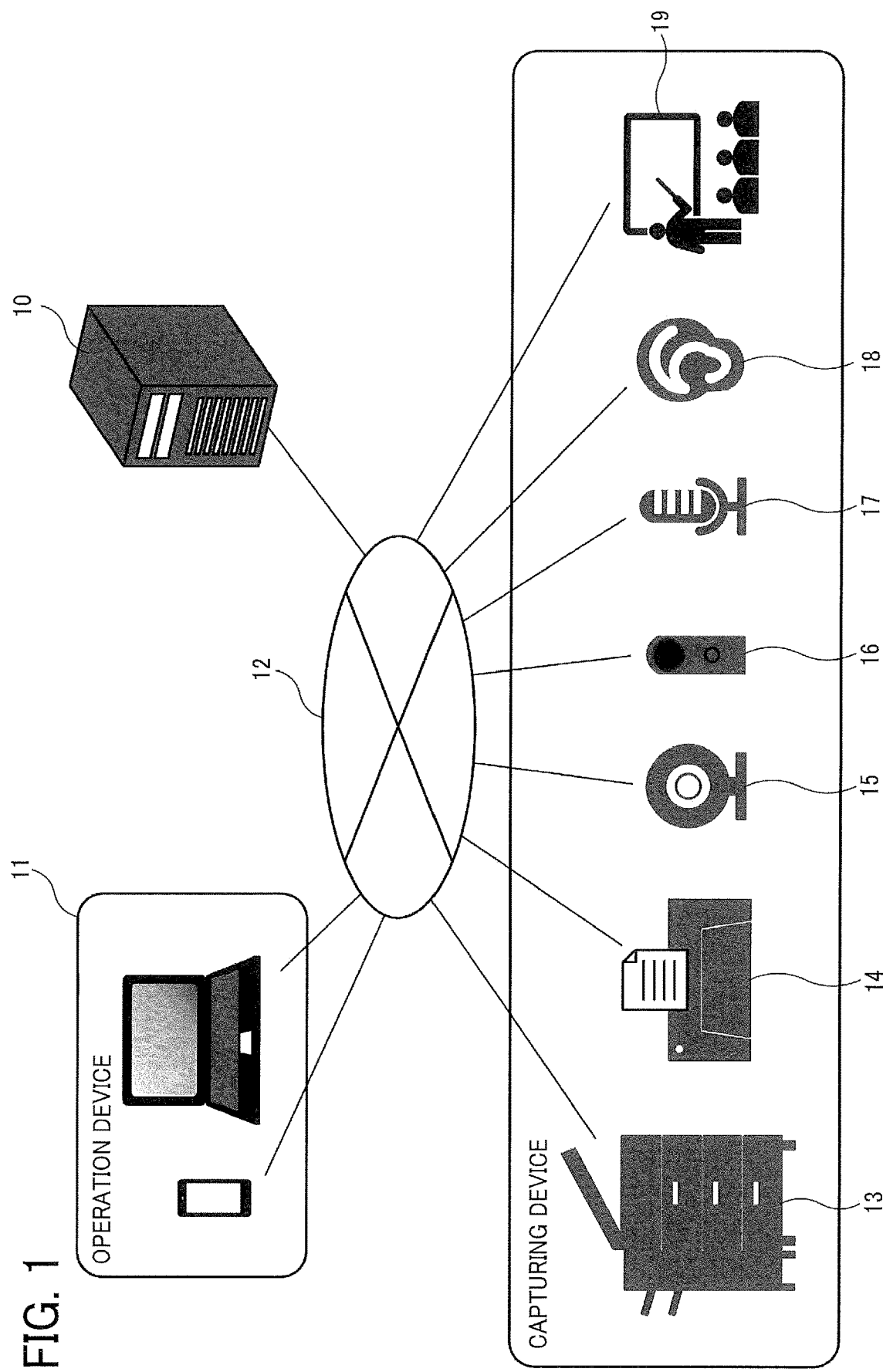
FIG. 1 is a schematic diagram illustrating an example of a configuration of a data processing system, according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

The present disclosure is described with reference to the following embodiments, but the present disclosure is not limited to the embodiments described herein.

FIG. 1 is a schematic diagram illustrating an example of a configuration of a data processing system. The data processing system includes a server 10 and an operation device 11. The server 10 is, for example, a data processing apparatus that includes a plurality of software installed thereon and executes the software to process data. The operation device 11 supports the software stored in the server 10. The data processing system further includes a capturing device that captures data and transmit the captured data to the server 10. The operation device 11 further has a function as the capturing device. In one example, the data is data of one page. In another example, the data is data of multiple pages.

A format of the data is any of image data, audio data, and text data. Examples of the audio data include, but are not limited to, voice data of customer reviews received at a call center. Examples of the text data include social network service (SNS) information such as blogs and tweets. The audio data of the voice of the customer and the SNS information include inquiries about products and services. The inquiries include contents of designated items such as satisfaction, dissatisfaction, and requests for the products and services. Examples of the image data include image data of contracts, invoices, and reports (e.g., daily business reports, and work reports). The image data is either data of a still image or moving image data. The audio data and the image data other than the text data are converted into text data using speech recognition or character recognition such as optical character recognition (OCR). Since the speech recognition and character recognition are well known techniques, the detailed descriptions thereof are omitted herein.

The server 10, the operation device 11, and the capturing device are connected to a network 12 and communicate with each other through the network 12. The server 10 is provided on a cloud network, for example. Examples of the plurality of installed on the server 10 include software for performing data conversion, software for performing translation, software for issuing invoices, software for managing expiration of contracts, and software for classifying and analyzing inquiry contents. These software are merely examples. In another example, the server 10 executes any other suitable software. The server 10 acquires data through the network 12, and performs a process on the acquired data by executing the software in response to an operation from the operation device 11. The server further transmits a processing result to the operation device 11. In the embodiment, examples of the process performed on the data include, but are not limited to, conversion, classification, and comparison for acquiring necessary information from the data. Specifically, the process includes conversion of a data format, translation, and classification and analysis of inquiry contents by the above described software.

The operation device 11 may be any device provided that the device is used by a user who uses the data processing system and has capability of operating software installed on the server 10. For example, the operation device 11 may be provided with a user interface that interacts with the user. Examples of the operation device 11 include, but are not limited to, a smartphone, a tablet terminal, a personal computer (PC), and a personal digital assistant (PDA).

The capturing device may be any device provided that the device has capability of acquiring data and transmitting the acquired data to the server 10. In addition to the operation device 11, examples of the capturing device include, but are not limited to, a multi-function peripheral (MFP) 13, a printer 14, a web camera 15, an imaging device (omnidirectional camera) 16 that captures images in all directions (360 degrees), a microphone 17, and a hearable device 18, which is a computer that is worn on the user's ears. Other examples of the capturing device include, but are not limited to, a projector (PJ), an interactive white board (IWB) 19, an industrial machine, a networked home appliance, an automobile (connected car), a game console, and a wearable PC.

The network 12 includes a local area network (LAN), a wide area network (WAN), and the Internet. The network 12 may be either a wired network or a wireless network. The network 12 is implemented by a single network or two or more networks that are connected to one another via a relay device such as a router.

Although FIG. 1 illustrates an example in which the server 10, the operation device 11, and the capturing device are provided individually, such a configuration is merely one example. In another example, one device may have the functions of the server 10 and the capturing device, and such one device and the operation device 11 implement the data processing system in combination. In still another example, the server 10 and the operation device having the functions of the capturing device implement the data processing system in combination.

Figure 2:
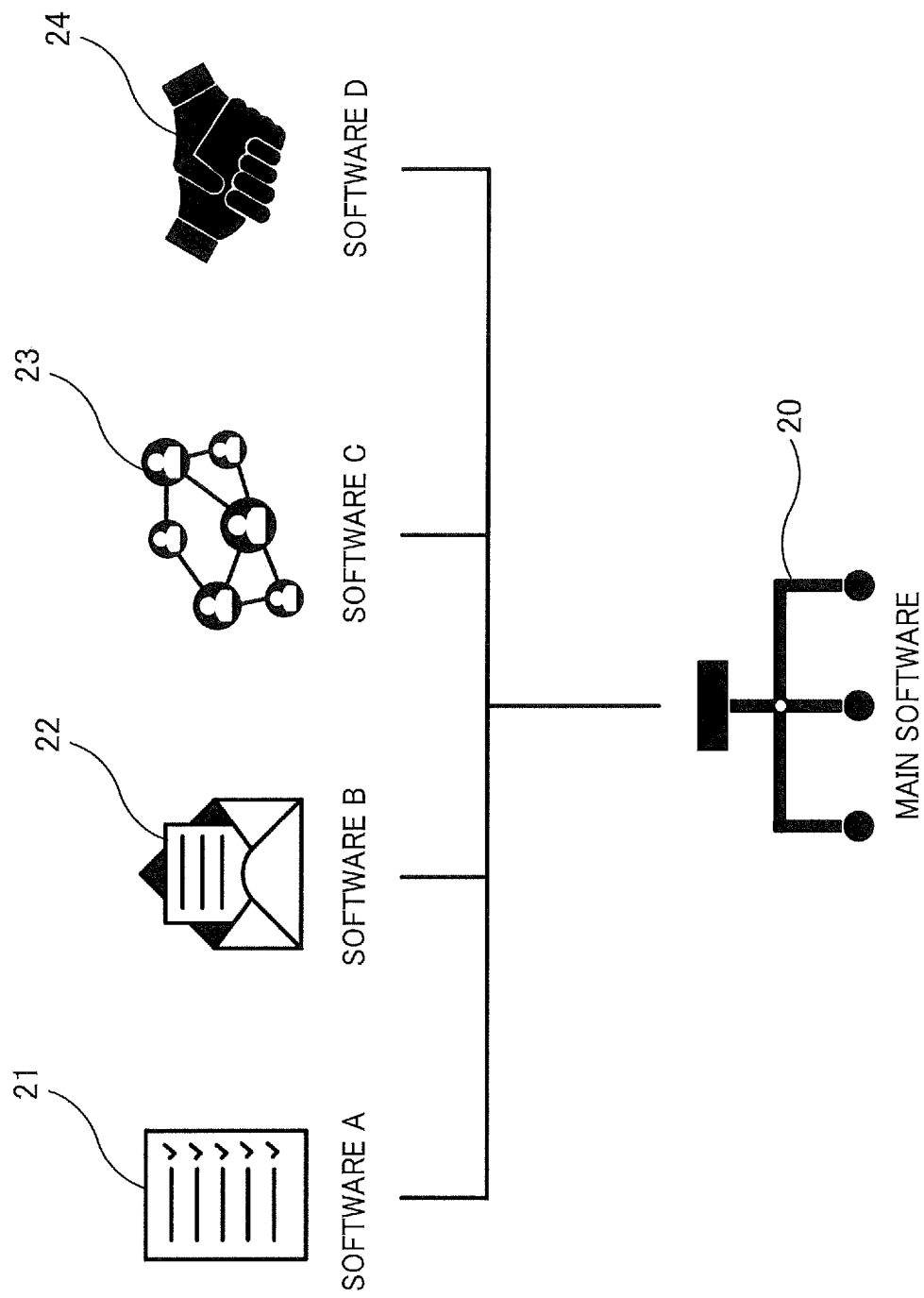
FIG. 2 is a diagram illustrating an example of a hardware configuration of a sever as a data processing apparatus, according to an embodiment of the present disclosure.

FIG. 2 is a diagram illustrating the relationship between various types of software installed on the server 10. The server 10 stores various types of software to execute a process on acquired data. The various types of software include main software 20 and various types of software 21 to 24 having different functions respectively. The main software 20 and the various types of software 21 to 24 perform a process in cooperation with each other.

The main software 20 has a function of analyzing content of text data by natural language processing using artificial intelligence (AI). For example, AI is based on machine learning, which learns regularity from a large amount of data and provides an answer to a given task. Examples of the machine learning include deep learning in which a hierarchical model is constructed using a neural network representing a human neural circuit and inference is performed using the hierarchical model. The neural network is classified into supervised learning and unsupervised learning. In the supervised learning, correct training data is input to input data and learning is performed to being optimized to the training data. The unsupervised learning does not require training data. AI implements highly accurate natural language processing by providing data and performing machine learning.

Natural language processing is a technology that causes a computer to process a natural language that is used routinely by humans. Examples of technology that processes Japanese language include morphological analysis, syntactic analysis, semantic analysis, and context analysis. The morphological analysis is a task of dividing a word into minimum units that cannot be further divided into words having meanings. The syntactic analysis is a task of analyzing the relation between the words divided by the morphological analysis to obtain the structure of sentence dependency. The semantic analysis is a task of analyzing which word should be selected to have a correct meaning in a case that two or more words may modify one word as a result of the syntactic analysis. The context analysis is a task of analyzing a relation between sentences.

The main software 20 analyzes content of character strings of text data by natural language processing, to extract a type of the text data and specific information corresponding to the type. The text data is classified to types according to the document format or usage, for example. Examples of the types classified according to the document format include, but are not limited to, a contract, a technical documentation, and a report. Examples of the types classified according to the usage include, but are not limited to, an inquiry, food safety, and manufacturing and distribution, as utilization applications of customer reviews in a food industry. The food industry is merely one example. The customers reviews relate to, for example, construction industry, transportation/communication industry, financial/insurance industry, retail industry, restaurant industry, and real estate industry. In a case that the types of text data are, for example, "invoice", "contract", "technical documentation", and "report", an area in a page where characters such as "invoice", "contract", "technical documentation", and "report" are present is learned in advance by machine learning. With this configuration, the type of text data is identified based on characters in the learned area. The area in a page is merely one example. In another example, the type of data is identified based on the analyzed content. For example, in a case that the text data includes characters such as a billing address, an amount, and a payment due, the type of the text data is identified as an invoice.

In a case that the types of text data are "inquiry", "food safety", and "manufacturing and distribution" as utilization applications of customer reviews, any of "inquiry", "food safety", and "manufacturing and distribution" is identified as the utilization application based on terms used in the text data or contexts of the text data. Further, each of "inquiry", "food safety", and "manufacturing and distribution" may be classified into categories, and a particular category to each of "inquiry", "food safety", and "manufacturing and distribution" is classified is identified. The category is an example of category information.

Examples of the categories to which "inquiry" is classified include, but are not limited to, "request/proposal" and "pointed-out issue/complaint". Examples of the categories to which "food safety" is classified include, but are not limited to, "digestive symptoms" and "headache/fever" as health damage. Examples of the categories to which "manufacturing and distribution" is classified include, but are not limited to, "foreign matter contamination" and "container damage/packaging box deformation" as manufacturing quality and distribution quality. These categories are merely examples. Any other suitable categories can be used.

In a case that the type of data is an invoice, the specific information is content of items designated in advance, such as an amount to be charged, a billing address, and a payment due. An area in a page where the specific information is present is also learned in advance by machine learning. With this configuration, information is extracted from characters, numbers, and the like in the leaned area. In another example, the specific information may be extracted from the analyzed content in substantially the same manner as the type of data. With this configuration, for example, numbers, characters, or the like that follows characters such as the amount to be charged, the billing destination, and the payment due are extracted. In a case that the type of data is an "inquiry", a phrase or a sentence including a designated term such as "want . . . ", "wish . . . ", or "request . . . " is extracted from the analyzed content.

The various types of software 21 to 24 are software that implement various functions, respectively. For example, the various types of software 21 to 24 are the software for performing data conversion, software for performing translation, software for issuing invoices, software for managing expiration of contracts, and software for classifying and analyzing inquiry contents.

The main software 20 passes the acquired data to the various types of software 21 to 24, manages processed data obtained by performing a process by the various types of software 21 to 24 in association with the acquired data. Further, the main software 20 manages cooperation with the various types of software 21 to 24. The cooperation with various types of software is managed based on management information that defines which software is to process data according to a type of the data.

Figure 3:
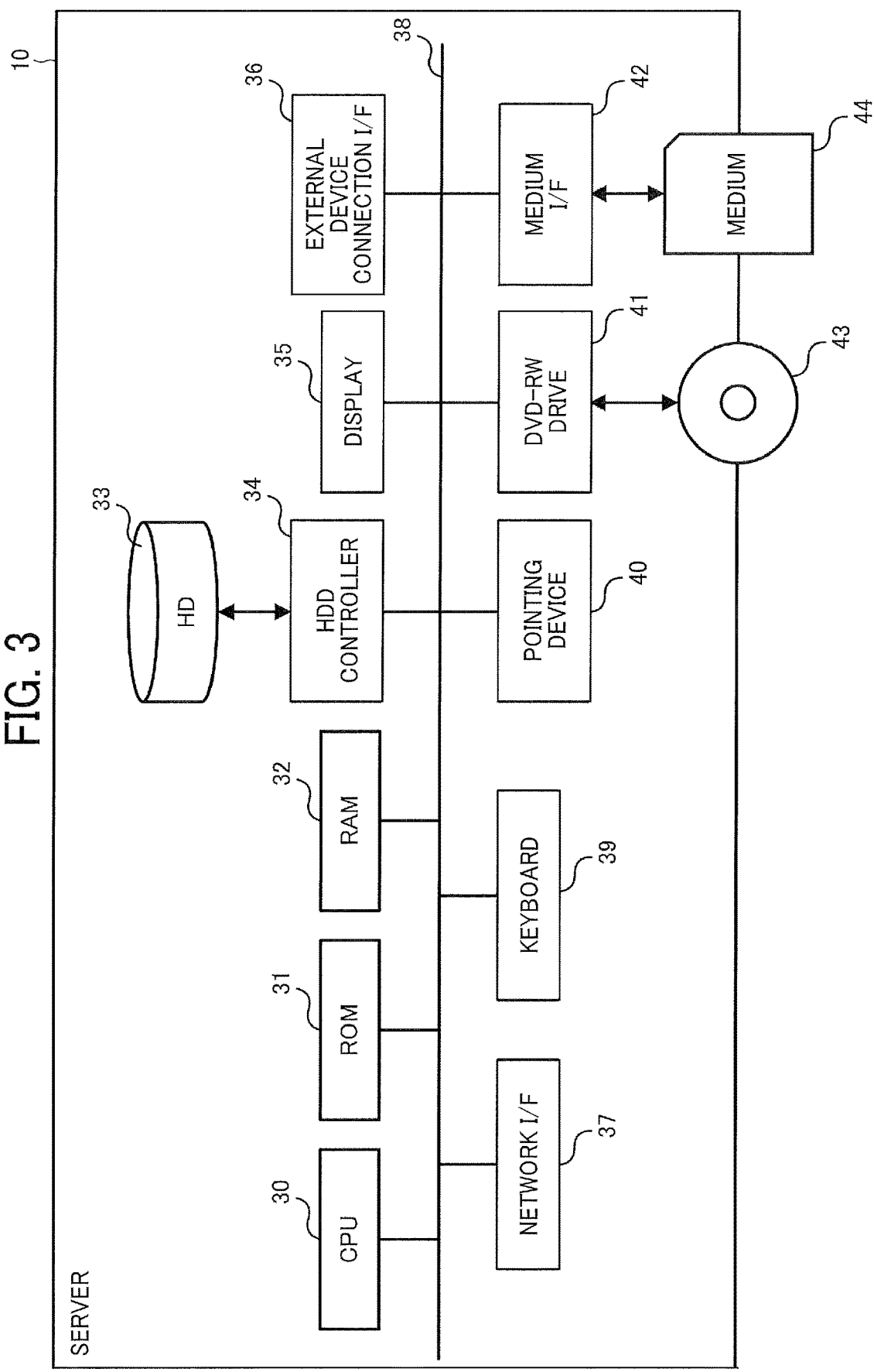
FIG. 3 is a diagram illustrating relationship between various types of software installed on a server, according to an embodiment of the present disclosure.

FIG. 3 is a block diagram illustrating an example of a hardware configuration of the server 10. The server 10 stores the software illustrated in FIG. 2 and includes hardware that executes the software. Specifically, the server 10 is implemented by a computer. The computer includes a central processing unit (CPU) 30, a read only memory (ROM) 31, a random access memory (RAM) 32, a hard disk (HD) 33, and a hard disk drive (HDD) controller 34. The server 10 further includes a display 35, an external device connection interface (I/F) 36, a network I/F 37, a data bus 38, a keyboard 39, a pointing device 40, a digital versatile disk rewritable (DVD-RW) drive 41, and a medium I/F 42.

The CPU 30 controls overall operation of the server 10 and executes the main software 20 and the various types of software 21 to 24. The ROM 31 stores programs such as an initial program loader (IPL) to boot the CPU 30. The RAM 32 provides a working area for the CPU 30. The HD 33 stores the main software 20 and the various types of software 21 to 24 to be executed by the CPU 30, an operating system (OS), information acquired from the capturing devices, and processed information obtained by performing a process on the acquired data by the software. The HDD controller 34 controls reading and writing of various data to and from the HD 33 under control of the CPU 30.

The display 35 displays various information such as a cursor, menu, window, characters, or image. The external device connection I/F 36 is an interface that connects the PC (the server 10) to various external devices. Examples of the external devices include, but are not limited to, a universal serial bus (USB) memory and the printer 14. The network I/F 37 is an interface that allows the PC to communicate data through the network 12. The data bus 38 is a bus that electrically connecting the components such as the CPU 30 with one another.

The keyboard 39 is one example of an input device (input means) provided with a plurality of keys for enabling a user to input characters, numerals, or various instructions. The pointing device 40 is an example of an input device (input means) that allows a user to select or execute a specific instruction, select an object for processing, or move a cursor being displayed. The DVD-RW drive 41 controls reading and writing of various data from and to a DVD-RW 43, which is an example of a removable storage medium. The DVD-RW is merely one example of the removable storage medium. In another example, a digital versatile disk recordable (DVD-R) is used as the removable storage medium. The medium I/F 42 controls reading and writing (storing) of data from and to a storage medium 44 such as a flash memory.

Figure 4:
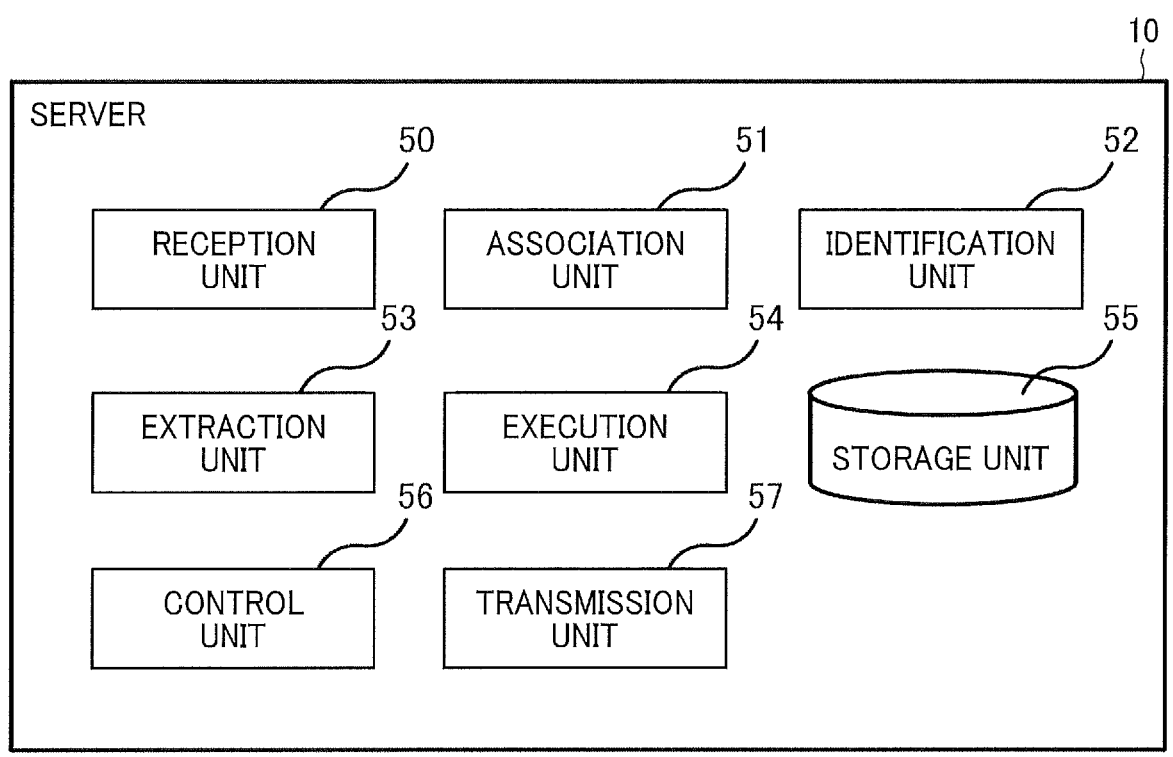
FIG. 4 is a block diagram illustrating an example of a functional configuration of a server, according to an embodiment of the present disclosure.

FIG. 4 is a block diagram illustrating an example of a functional configuration of the server 10. One or more processing circuits of the server 10 execute the main software 20 and the various types of software 21 to 24 to implement functions described below. In one example, the CPU 30 illustrated in FIG. 3 is used as the processing circuit. In another example, the processing circuit is a device such as an application specific integrated circuits (ASIC), a digital signal processor (DSP), a field programmable gate array (FPGA), or a conventional circuit designed to perform the functions.

The server 10 includes, as functional units, a reception unit 50, an association unit 51, an identification unit 52, an extraction unit 53, an execution unit 54, a storage unit 55, a control unit 56, and a transmission unit 57. The reception unit 50 also functions as an acquisition unit, and receives and acquires data from the capturing device. The reception unit 50 receives a user identifier (ID) and a password as user identification information input by the user at the time of login. The reception unit 50 further receives an instruction from the user. For example, the user ID and the password are input using an input device such as a keyboard of the capturing device. In another example, the user ID and the password are stored in an integrated circuit (IC) card or the like and read by a reading device. In one example, the user ID and the password is a combination of characters, numbers, symbols, and the like. In another example, the user ID and the password are implemented by biometric information such as a fingerprint or a vein of a user.

The association unit 51 assigns, to the acquired data, identification information for identifying the data. As the identification information, consecutive numbers (data numbers) can be used. The consecutive numbers are merely an example of the identification information. In another embodiment, the identification information is randomly generated number or a combination of two or more of numbers, characters, and symbols. For example, identification information "10000" is assigned to Data 1, and identification information "10001", which is different the identification information assigned to Data 1, is assigned to Data 2.

The identification unit 52 identifies a type of data of the acquired data based on text data included in the acquired data. The extraction unit 53 extracts specific information in the text data based on extraction content associated with the type of data. The identification of the type of data by the identification unit 52 and the extraction by the extraction unit 53 are performed, for example, by natural language processing using the AI described above. The natural language processing is merely one example, and any other suitable method can be used provided that the type and the specific information are extracted from the text data. The execution unit 54 executes one or more processes on the data according to the identified type of data. For each type of data, one or more software for implementing one or more processes are set.

The association unit 51 associates the identified type of data and the extracted information as tags with the data number and the user ID. Further, the association unit 51 assigns identification information to processed data, which is data obtained by performing a process by the execution unit 54. Since data on which the process is not yet performed by the execution unit 54 are different from the processed data, different pieces of identification information are assigned to the data items respectively. In order to distinguish the data items from other data, a certain data number as the identification information is assigned to the data on which the process is not yet performed by the execution unit 54, and the same data number to which a certain character is affixed is assigned to the processed data. For example, identification information "10000" is assigned to original Data 1, which is data on which the process is not yet performed by the execution unit 54, and identification information "10000a", which is identification information to which a character "a" is affixed, is assigned to processed Data 1.

The storage unit 55 stores the original data and the processed data in association with each other. The storage unit 55 stores the data number and the user ID in association with each other. The storage unit 55 further stores the extraction content, the software to be executed, which are set for the type of data. The storage unit 55 further stores data tagged with the type of data or extracted content.

The transmission unit 57 transmits search screen information and a data list. Further, the transmission unit 57 transmits at least one of the original data, a list of processed data, and a list of other processes. The list of other processes is a list of software to be selected by a user.

The control unit 56 receives a user's instruction from the operation device 11 such as an input of search information, selection of data from the data list, selection of particular processed data from the list of processed data, selection of particular software from the list of software. In response to receiving selection of the original data or the processed data, the control unit 56 acquires the selected data from the storage unit 55, transmits the acquired data to the operation device 11 via the transmission unit 57, and instructs a display to display the data as an output. Display on the display is merely one example of an output. In another example, the output includes display by projection and printing on a recording medium such as a paper sheet. In response to selection of particular software, the control unit 56 instructs the execution unit 54 to activate the selected software and execute a process using the processed data.

Figure 5:
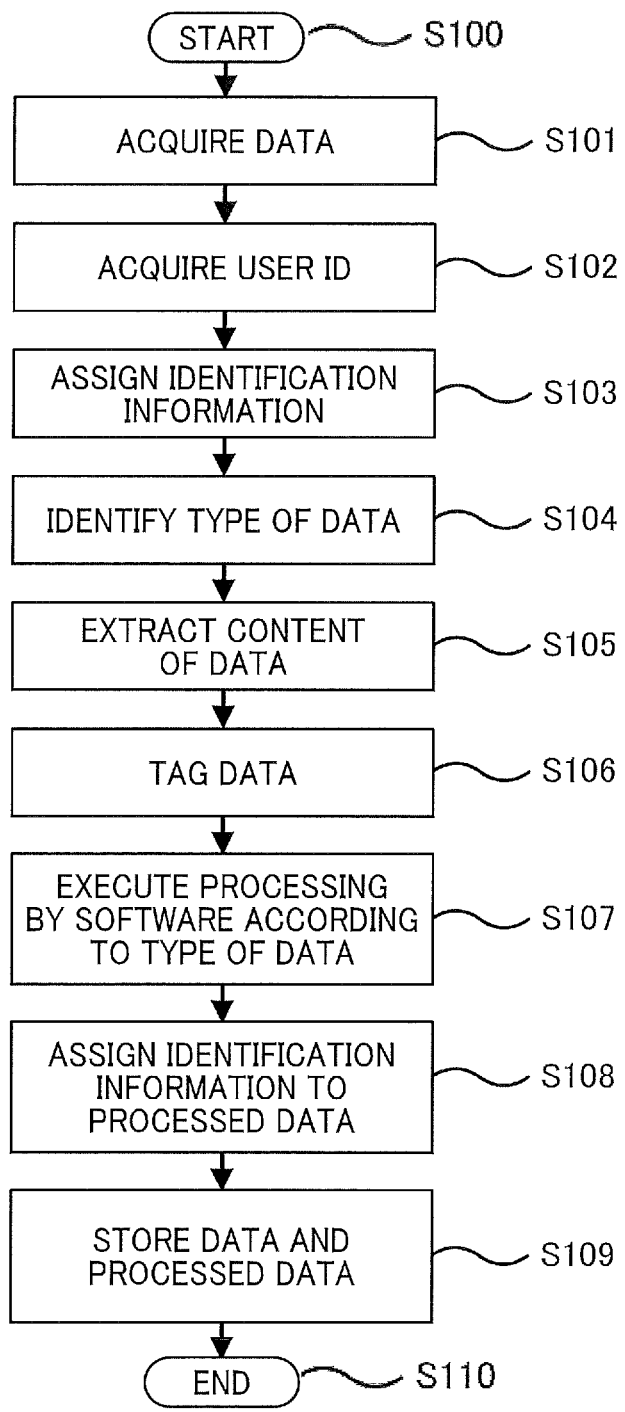
FIG. 5 is a flowchart illustrating steps in an operation performed by a server from acquisition of data to storage of processed data, according to an embodiment of the present disclosure.

FIG. 5 is a flowchart illustrating steps in an operation performed by the server 10 from acquisition of data to storage of processed data. The operation starts in step S100 in response to acquisition of data by one of the capturing devices and transmission of the acquired data to the server 10. In step S101, the reception unit 50 receives and acquires the data transmitted from the capturing device. For example, the data is data transmitted from the PC or the smartphone to the server 10 through the network 12. In another example, the data is text data converted from image data by a device having an optical character recognition (OCR) function, such as the MFP 13, and transmitted to the server 10 through the network 12. In still another example, the data is text data converted from audio data by speech recognition and transmitted to the server 10. The server 10 may have an OCR function and a speech recognition function and internally convert received image data or audio data into text data.

When transmitting data from the capturing device, the user can input login information to log in to the data processing system. In step S102, the reception unit 50 receives and acquires a user ID that is input at the time of login. A description is given in the embodiment of is an example in which user login is performed at the capturing device and the user intentionally performs data transmission. However, this is merely one example. In another example, this process is performed in response to storing data in a specific folder on the server 10. In still another example, this process is performed in response to printing or scanning by the MFP 13. In a case that a user does not log in to the capturing device, the data is transmitted after the user logs in by inputting a user ID and a password. Thus, the server 10 acquires the data and the user ID.

In step S103, the association unit 51 assigns identification information to the acquired data. FIG. 6 is a table illustrating an example of the identification information assigned to the acquired data. The identification information is a data number of numbers, and each time data is acquired, a consecutive number obtained by adding 1 is assigned. Such consecutive numbers are merely examples of the identification information. The identification information may include random numbers, characters, symbols, or the like provided that data is identified by the identification information.

Referring again to FIG. 5, in step S104, the identification unit 52 identifies a type of the data from text data included in the data. The type of data is identified by reading content of text included in the data using AI. The classification of types of data varies depending on what kind of classification function is provided to the AI. For example, the data classification is performed based on the type of document format described above such as an invoice, a contract, and an order form. In another example, the data classification is performed based on the type of utilization of customer reviews described above such as an inquiry, food safety, and manufacturing and distribution. The association unit 51 tags the data with the information on the type identified by the identification unit 52 as a tag.

In step S105, the extraction unit 53 extracts specific information from the text data included in the data. The specific information is extraction content set in advance for each of the types of data as illustrated in FIG. 7. For the invoice as the type of data, the extraction content includes an amount, a destination, and a payment due date. For the contract as the type of data, the extraction content includes a contract content, a counterparty, and a term. For the technical documentation as the type of data, the extraction content includes an abstract and a technical field. A page and an area in the page in which the extraction content is generally written are learned in advance by machine learning, the extraction content is extracted from the learned area of the page. In another example, in a case that there is a subtitle such as an abstract or a technical field, a portion following the subtitle is be extracted as the content of the abstract or the technical field. In a case that there is no subtitle such as an abstract or a technical field, extraction can be performed from the above-described area. In another example, extraction is performed from description content. In a case that extraction is performed from the description content, a keyword or the like is extracted, and an abstract or a technical field may be created from the keyword or the like.

Referring again to FIG. 5, in step S106, the association unit 51 tags the data using the extracted content as a tag. FIG. 8 is a table illustrating an example in which the data is tagged with the type and the content. The data is indicated by the data number, and the user ID, the type, the content such as an amount or a destination are associated with the data number.

Referring again to FIG. 5, in step S107, the execution unit 54 executes one or more processes by one or more software according to the type of data. The process also includes storing the data and registering the data. The server 10 stores a database as illustrated in FIG. 9, which indicates, for each of the types of data, one or more software by which one or more processes is to be performed. In FIG. 9, Software A is set for an invoice a type of data, and two software, i.e., Software B and Software C are set for a contract as a type of data. Accordingly, when an invoice is identified as the type of data, the execution unit 54 executes only a process by Software A. When a contract is identified as the type of data, the execution unit 54 executes two processes by Software B and Software C.

An administrator of the data processing system or a user selects one or more desired software for each of the types of data, to set one or more software for each of the types of data in advance. Further, software frequently used by a user can be set in association with the types of data. In one example, the database as illustrated in FIG. 9 is associated with a user ID and provided for each user. For example, for User X, Software B and Software C are set as software for a contract. Further, for example, for User Y, only Software B is set as software for a contract. With this configuration, the server 10 refers to the database, to determine which process is to be executed in consideration of the user ID. In one example, one database is provided for each of one or more specific users, and another database is separately provided for users other than the specific one or more users.

Referring again to FIG. 5, in step S108, the association unit 51 assigns identification information to processed data, which is obtained by executing one or more processes by the execution unit 54. Thus, original data, which is data on which one or more processes are not yet performed, and the processed data are associated with each other. Further, the association unit 51 can assign, to these data items, information relating to software that has executed one or more processes. The information relating to software is, for example, a software name.

In step S109, the storage unit 55 stores the processed data associated with the original data. By thus storing the original data and the processed data in association with each other, the processed data can be acquired at a timing required by a user. After the storage of the data, the operation ends in step S110.

When the original data includes text data, the type of data is identified based on the text data, and the content is extracted. However, the original data does not always include text data like image data or audio data. Further, the original data is sometimes in a portable document format (PDF) format, in which a font, a layout, or the like does not change depending on types of a terminal. Sometimes, character recognition is not performed on such data.

In this case, extraction of text data or conversion to text data is to be performed on such data. To address this issue, between step S101 and step S102 illustrated in FIG. 5, a process can be performed that determines whether the data has text data. In a case that the data does not have text data, a process of converting the data into text data is executed.

FIG. 10 is a flowchart illustrating an example of a process of converting data into text data. After the data is acquired in step S101 illustrated in FIG. 5, the conversion process starts in step S200. To perform the conversion process, the server 10 may further include a determination unit, a text data acquisition unit, and a conversion unit. In step S201, the determination unit determines whether the acquired data includes text data. When the determination unit determines that the acquired data includes text data (S201: YES), the operation proceed to step S207, and the conversion process ends.

When the determination unit determines that the acquired data does not include text data (S201: NO), the operation proceeds to step S202. In step S202, the determination unit determines whether the acquired data is image data or data in the PDF format (PDF data). The determination unit determines whether the acquired data is image data or PDF data based on attribute information added to the acquired data. The attribute information includes information on a type of file when data is recorded as a file. The determination based on the attribute information is merely one example. Whether the acquired data is image data or PDF data is determined in any other suitable method.

When the determination unit determines that the acquired data is image data or PDF data (S202: YES), the operation proceeds to step S203. In step S203, the text data acquisition unit acquires text data included in the image data or PDF data. For example, the text data acquisition unit performs character recognition processing such as OCR to acquire text data from image data or PDF data. After the text data acquisition unit acquires text data, the operation proceeds to step S207, and the conversion process ends.

When the determination unit determines that the acquired data is neither image data nor PDF data (S202: NO), the operation proceeds to step S204. In step S204, the determination unit determines whether the acquired data is audio data. The determination unit determines whether the acquired data is audio data based on the attribute information, in substantially the same manner as described above with respect to image data and PDF data. The determination whether the acquired data is audio data based on the attribute information is also merely one example. Whether the acquired data is audio data is determined in any other suitable method. When the determination unit determines that the acquired data is audio data (step 204: YES), the conversion unit converts the audio data into text data. For example, the audio data is converted to text data using a speech recognition engine equipped with AI. Speech recognition processes noises, for example, identifies phonemes from sound waves, identifies a sequence of phonemes to convert the sequence of phonemes into words, generates a sentence from a sequence of words, and outputs the sentence as text. A phoneme is the minimum constitution unit of sound. After the conversion unit converts audio data into text data, the operation proceeds to step S207, and the conversion process ends.

When the determination unit determines that the acquired data is not audio data (S204: NO), the operation proceeds to step S206. In step S206, the determination unit classifies the acquired data as other data. Then, the operation proceeds to step 207, and the conversion process ends. Accordingly, the acquired data that is classified as other data is not converted into text data, and the type of data is not identified and content is not extracted from such data.

Figure 11A:
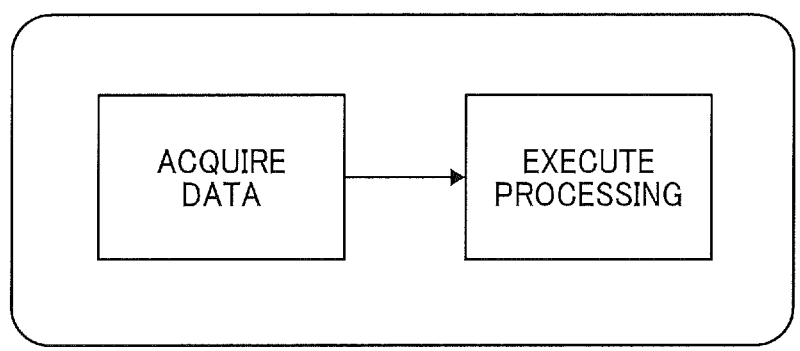
FIG. 11A and FIG. 11B are diagrams illustrating types of software and processing performed by each type of software, according to an embodiment of the present disclosure.
Figure 11B:
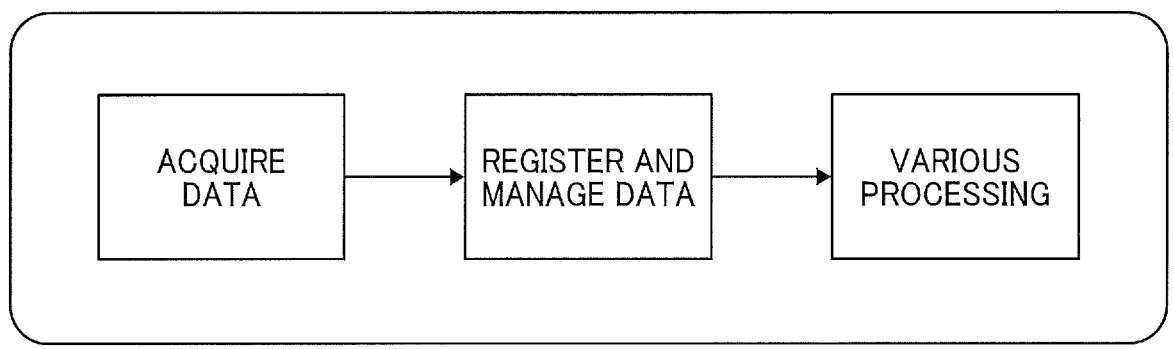

The software for implementing various processes is roughly divided into two categories as illustrated in FIG. 11A and FIG. 11B. One type is processing completion type software in which processing completes only with a series of flows. FIG. 11A is a diagram illustrating an example of processing by the processing completion type software. As illustrated in FIG. 11A, the processing completion type software captures data and perform processing on the data, thereby a series of processing is completed and processed data is generated. Examples of the processing completion type software include, but are not limited to, software that captures data and converts the captured data into PDF. In this case, the processed data is PDF data.

The other type is processing selection type software having a plurality of processing flows. In the processing selection type software, a user selects a desired process flow to be executed in a usage scene. FIG. 11B is a diagram illustrating an example of processing by the processing selection type software. As illustrated in FIG. 11B, the processing selection type software captures data and registers the captured data for management. A user selects a later process to cause the selected process to be executed. Examples of the processing selection type software include, but are not limited to, software for capturing an invoice, registering the captured invoice, and managing the registered invoice by tagging, for example. The later process is other process such as performing a task of determining whether to make a payment or examining and approving. A user handles corresponding software to execute the later process.

In the processing by the processing selection type software, data are automatically inputted based on content extracted from the data and registered as data for software used in the later process. A user activates the software to cause the registered data to be automatically output or to analyze the registered data. With this configuration, a user can cause necessary processing to be performed at the necessary timing with minimum efforts.

In another example, the main software some or all of the functions of the processing completion type software and the processing selection type software.

Figure 12:
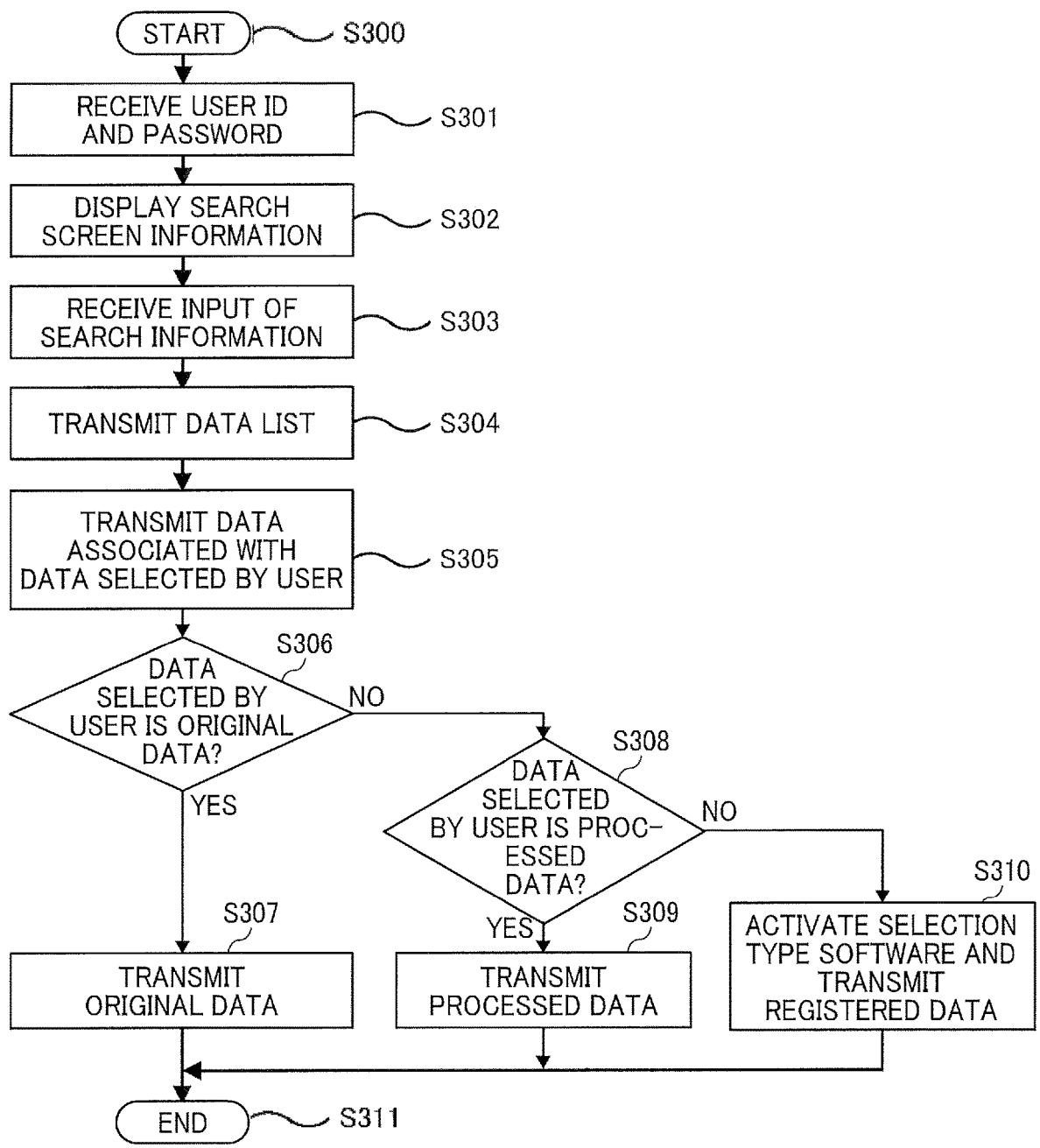
FIG. 12 is a flowchart illustrating an example of operation performed by a server after storage of data, according to an embodiment of the present disclosure.

FIG. 12 is a flowchart illustrating an example of operation performed by the server 10 after the storage of the data and the processed data. After storing the data and the processed data, the server 10 starts the operation in step S300 in response to a user's operation to the operation device 11 at the user's desired timing. In step S301, the server 10 receives a user ID and a password, which are input by the user.

In step 302, the control unit 56 of the server 10 transmits information of a search screen to the operation device 11 operated by the user via the transmission unit 57, and causes the display of the operation device 11 to display the search screen. The user refers to the displayed search screen and inputs search information according to an instruction on the screen. In step S303, the reception unit 50 receives an input of the search information from the user. In step S304, the control unit 56 searches for data according to the search information, and transmits a list of the retrieved data to the operation device 11 via the transmission unit 57 to cause the operation device to display the list.

Figure 13:
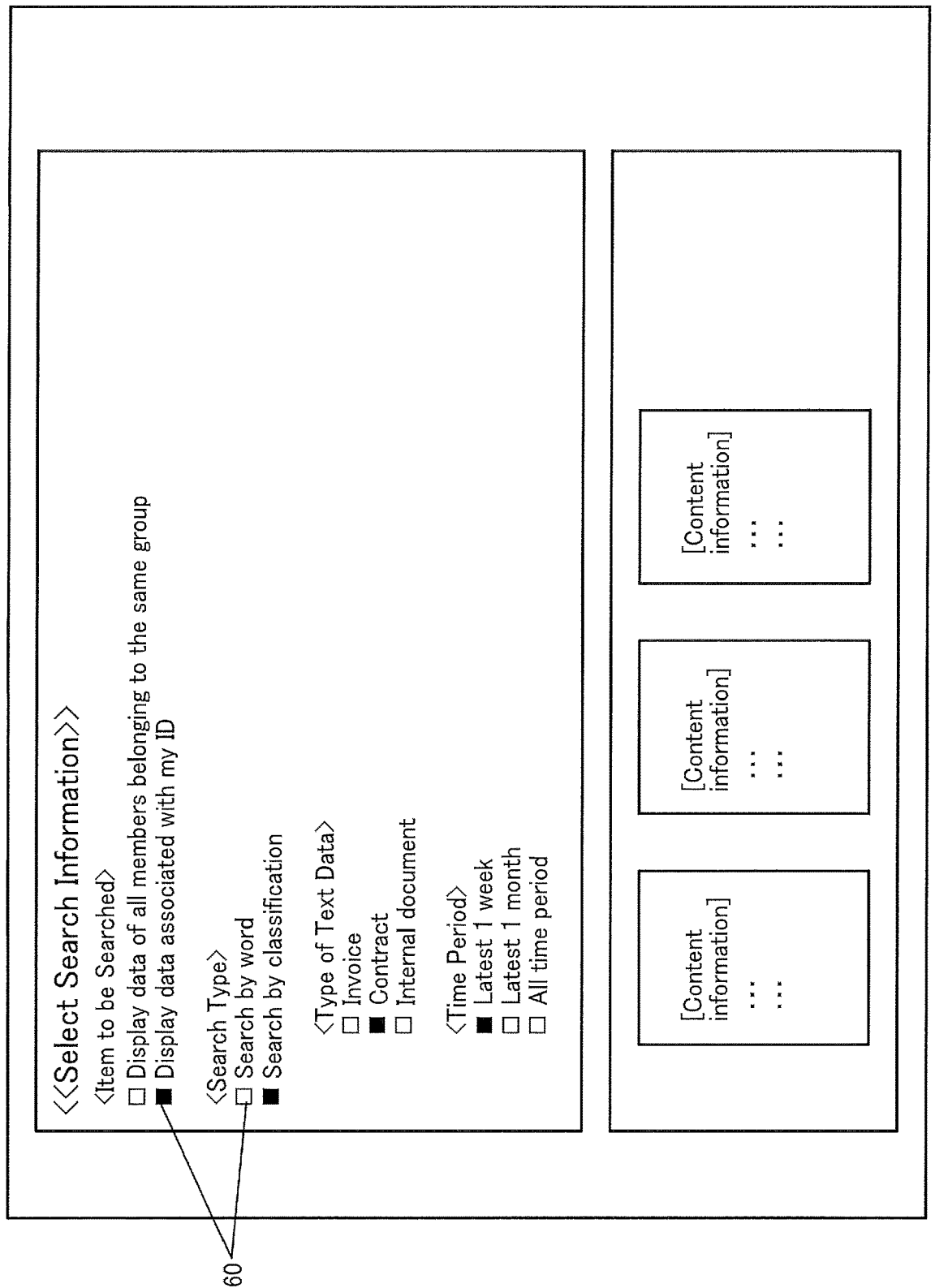
FIG. 13 is a diagram illustrating an example of a screen displayed on an operation device used by a user, according to an embodiment of the present disclosure.

FIG. 13 is an illustration of an example of the search screen displayed on the display of the operation device 11. The search screen includes, as the search information, check boxes 60 for selecting an item to be searched and a search type. The item to be searched includes options "Display data of all members belonging to the same group" and "Display data associated with my ID", and the user selects one from the two options.

The search types includes "Search by word" and "Search by classification", and the user selects one from the two options. When "Search by word" is selected, an entry field is displayed in which the user enters, for example, a word or a phrase included in the text data. When "Search by classification" is selected, for example, types of text data is displayed as the classification. The types of text data include "invoice", "contract", and "internal document". The search screen further displays options of a time period. The options of time period include "Latest one week", "latest one month", and "all time period". These options are subdivided classifications, and the user can select desired options corresponding to data that the user wants to acquire from these options. These options are merely examples. In another example, any other suitable options are provided.

When the user selects a desired type or time period, the server 10 searches for data of the selected type stored in the selected time period, and transmits a list of the retrieved data to the operation device 11 operated by the user. The operation device 11 displays the data list from which the user can select one data item. Each of data items in the data list is displayed as a reduced image (thumbnail) of the identified type of data and the extracted content, for example.

Referring again to FIG. 12, in step S305, the control unit 56 transmits the processed data associated with the data selected by the user via the transmission unit 57, to cause the operation device 11 to display the processed data.

Figure 14:
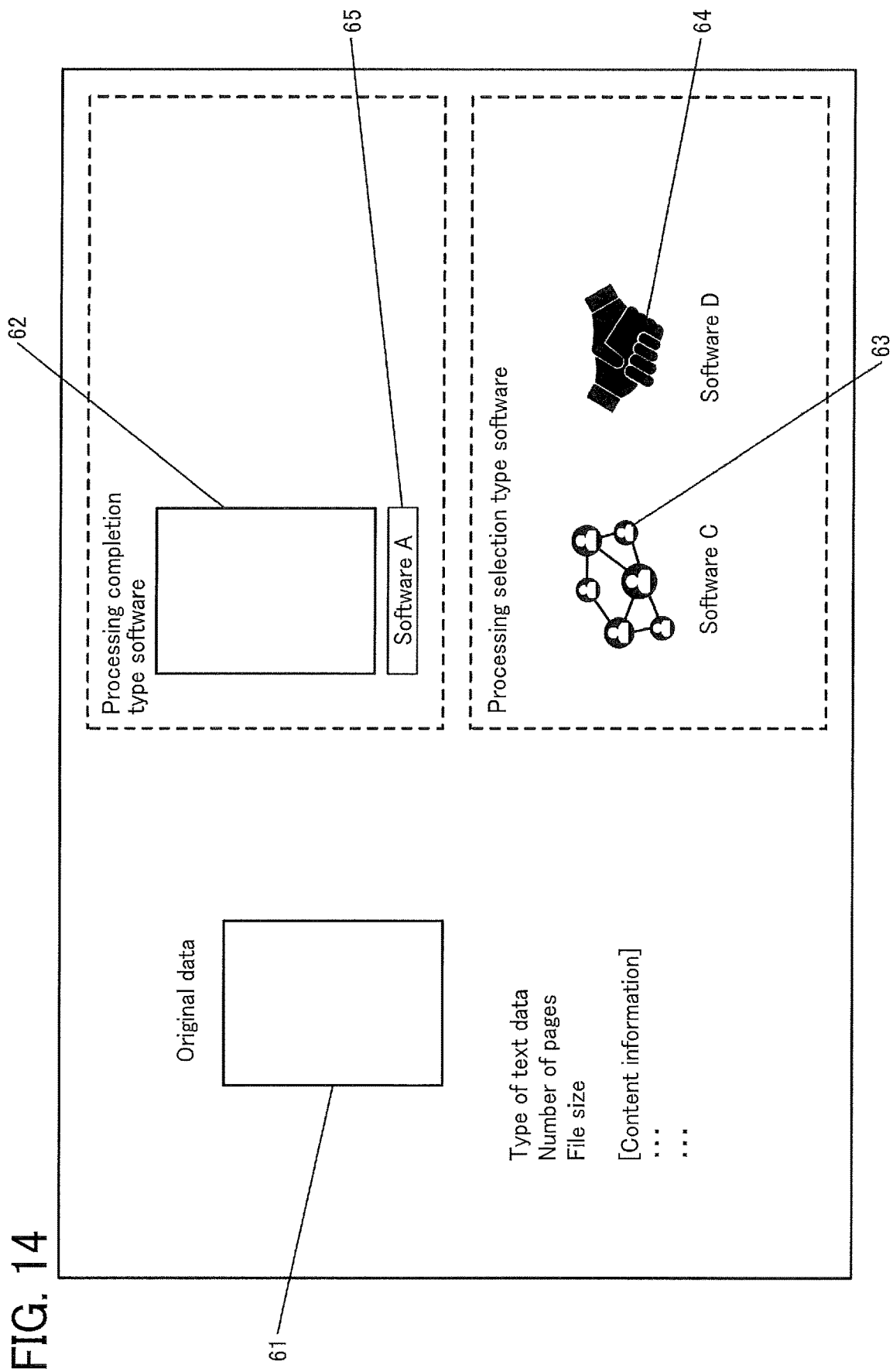
FIG. 14 is a diagram illustrating a first example of a screen displayed when one data item is selected at an operation device, according to an embodiment of the present disclosure.

FIG. 14 is a diagram illustrating a first example of a screen displayed when one data item is selected at the operation device 11. On the screen, a thumbnail 61 representing original data, a thumbnail 62 representing processed data processed by the processing completion type software, and an icon 63 and an icon 64 each representing the processing selection type software are displayed.

Below the thumbnail 61, a type of data, the number of pages, a file size, and content information as the extracted content are displayed. Below the thumbnail 62, a button 65 is displayed, which, when selected, allows the user to access software. The user selects one of the thumbnail 61, the thumbnail 62, the icon 63, and the icon 64 by clicking, tapping, or the like, to request display of the original data, display of the processed data obtained by processing by the processing completion type software, or execution of processing by the processing selection type software.

Referring again to FIG. 12, in step S306, the determination unit determines whether the thumbnail 61 representing the original data is selected from the thumbnail 61, the thumbnail 62, the icon 63, and the icon 64 at the operation device 11. When the determination unit determines that the original data is selected (S306: YES), the operation proceeds to step S307. In step S307, the control unit 56 transmits the original data via the transmission unit 57, to cause the display of the operation device 11 to display the original data.

When the determination unit determines that data other than the original data is selected(S306: NO), the operation proceeds to step S308. In step S308, the determination unit determines whether the thumbnail 62 representing the processed data obtained by processing by processing completion type software is selected. When the determination unit determines that the processed data is selected (S308: YES), the operation proceeds to step S309. In step S309, the control unit 56 transmits the processed data via the transmission unit 57, to cause the display of the operation device 11 to display the processed data. In a case that multiple thumbnails 62 are displayed each representing processed data, the control unit 56 transmits processed data corresponding to the selected thumbnail, to cause the operation device 11 to display the transmitted processed data.

When the determination unit determines that the processed data is not selected (S308: NO), the determination result indicates that one of the processing selection type software has been selected, and the operation proceeds to step S310. In step S310, the control unit 56 activates the selected processing selection type software, and transmits registered data to the operation device 11 via the transmission unit 57, to cause the display of the operation device 11 to display a page of the transmitted registered data. Then, the control unit 56 performs processing on the displayed page.

After the transmission of the data to the operation device 11 in step S307, S309, and S310, the operation by the server 10 ends in step S311. The registered data is data of a page associated with the data selected by the user. In a case that the original data is voice data, such voice data cannot be displayed on the screen. In such a case, text data obtained by converting the voice data is displayed as original data.

Figure 15:
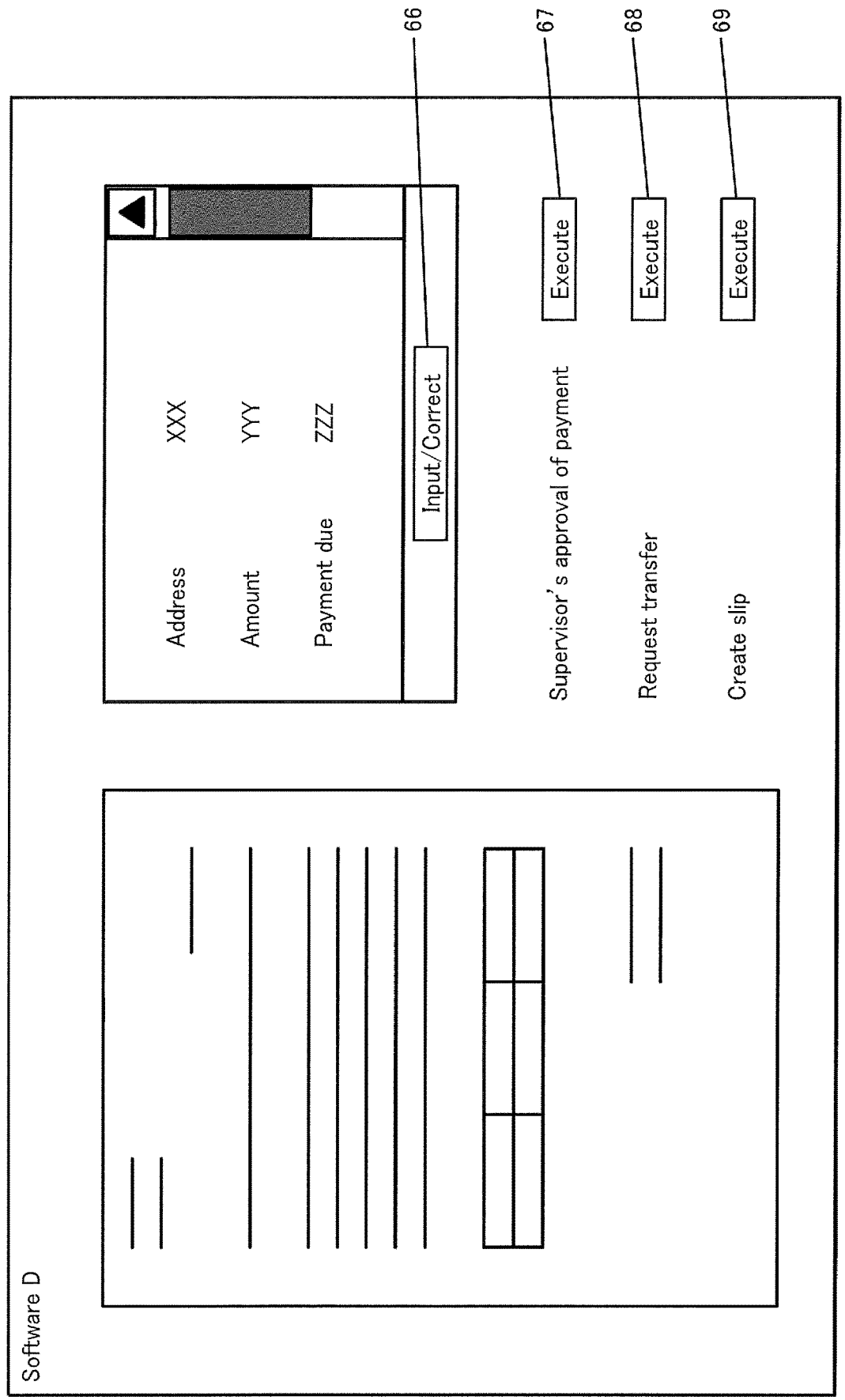
FIG. 15 is a diagram illustrating an example of a screen displayed when one software is selected on the screen illustrated in FIG. 14, according to an embodiment of the present disclosure.

FIG. 15 is a diagram illustrating an example of a screen displayed when Software D is selected on the screen illustrated in FIG. 14. Software D is, for example, software that performs predetermined processing on an invoice received from an outside company. When Software D is selected by an operation such as clicking or tapping on the screen illustrated in FIG. 14, Software D is activated.

Generally, in order to open an invoice, one has to first activate software and then select data. By contrast, in the operations of this embodiment, as illustrated in FIG. 15, information extracted in advance by the language processing is automatically input to an entry field of a predetermined form in response to the activation of Software D, and the registered data is displayed.

An "input/correct" button 66, an "execute" button 67, an "execute" button 68, and an "execute" button 69 are displayed on the screen. The "input/correct" button 66 is a button which, when selected, allows a user to directly enter a desired value in an item to which any value is not yet entered or allows a user to correct a value in an item to which an incorrect value is already entered. The "execute" button 67 is a button, which, when selected, allow a user to apply for approval by a supervisor. In response to selection of the "execute" button 67, the server 10 transmits an invoice in which the data is automatically input, a created slip, or the like to the supervisor for approval application. The transmission to the supervisor is performed using any suitable means such as an e-mail application. The "execute" button

68 is a button for transferring an approved slip and requesting payment. The "execute" button 69 is a button for creating a slip on which a payment destination, an amount, and the like are to be written. These buttons are merely examples of buttons for executing the corresponding processing on the registered data by Software D. In another example, any other suitable processing is executed.

By using the data in which the information extracted in advance is registered as described above, the user starts the software at a time when the user wants processing to be executed, to cause the server 10 to execute processing the process, without inputting data.

Figure 16:
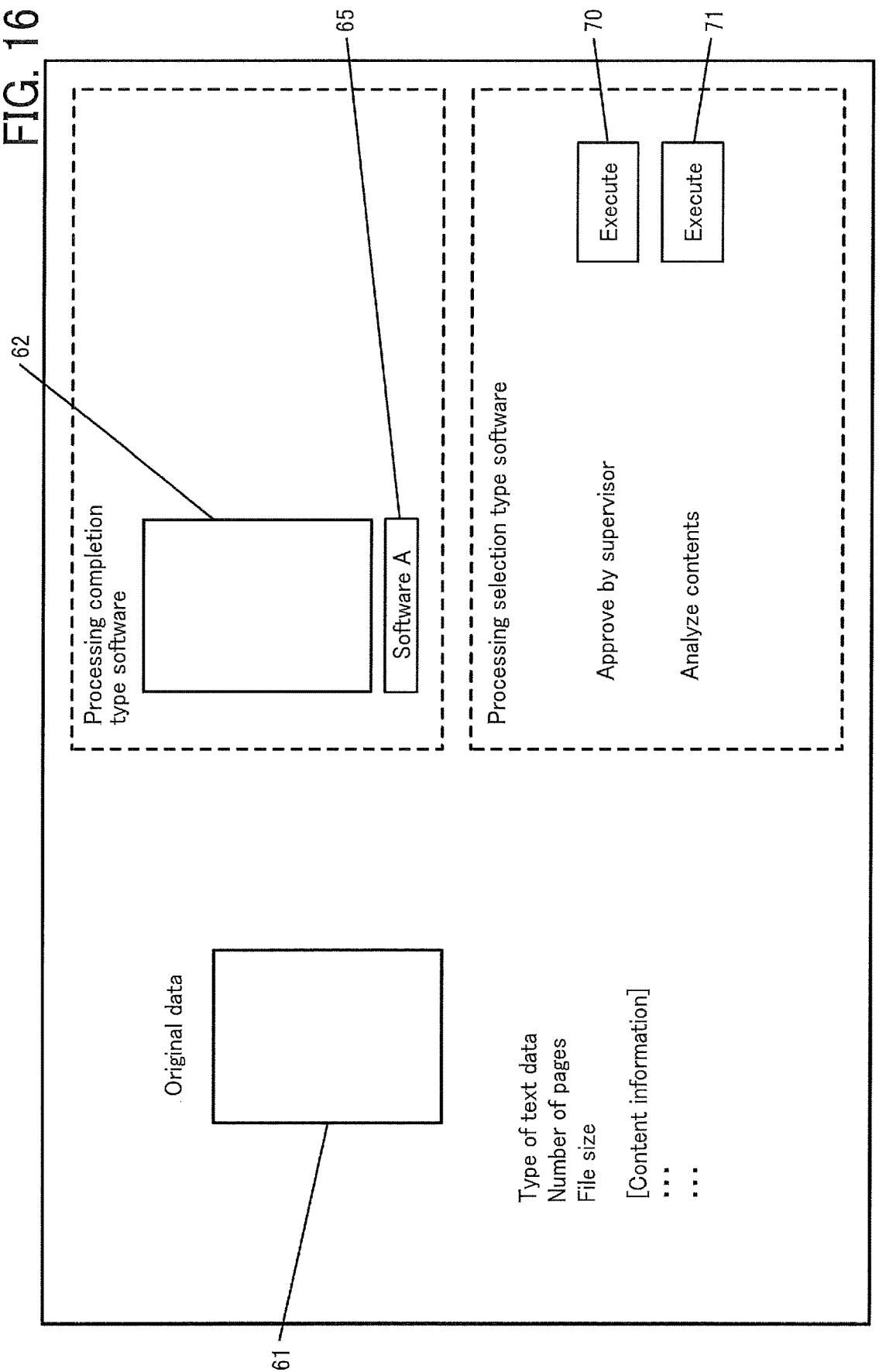
FIG. 16 is a diagram illustrating a second example of a screen displayed when one data item is selected at an operation device, according to an embodiment of the present disclosure.

FIG. 16 is a diagram illustrating a second example of a screen displayed when one data item is selected at the operation device 11. On the screen, the thumbnail 61 representing original data and the thumbnail 62 representing processed data processed by the processing completion type software are displayed. In the example illustrated in FIG. 15, the processing selection type software is displayed in the form of an "execute" button 70 and an "execute" button 71 each receiving an instruction to execute the corresponding processing, instead of the icons representing software.

In a case that the icon representing software is displayed, software corresponding to the icon is activated to cause the registered data to be displayed, and then, for example, prescribed software for executing processing for applying for approval by a supervisor is activated. By contrast, in a case that the "execute" button is displayed, a prescribed software starts up in response to selection of the "execute" button. This reduces time and efforts for a user to perform an operation.

The "execute" button 70 is a button, which, when selected, allow a user to apply for approval by a supervisor, in substantially the same manner as the "execute" button 67 illustrated in FIG. 15. In response to selection of the "execute" button 70, the server 10 transmits, for example, an invoice in which the data is automatically input to the supervisor. The transmission to the supervisor is performed using any suitable means such as an e-mail application. The "execute" button 71 is a button for activating unique document analysis software. The document analysis software is software that allows a user to analyze described contents, to check extension of a due date for submitting a document, and to submit a document in consideration of the due date. These processing are merely examples. In another example, the server 10 executes any other suitable processing.

The server 10 performs each preset process on data acquired from the capturing device and store the processed data obtained by performing the process. In another example, the server 10 performs two or more consecutive processes as a part of a preset workflow on the data, store the processed data, and execute the remaining processes of the workflow in response to an instruction from the user.

Although the description is given above is of an example in which data is classified according to a type of a document format, in another example, data may be classified according to other criteria. As an example of other criteria, data may be classified according to types of utilization application of customer reviews. For example, data of the customer reviews is automatically analyzed and classified from three viewpoints of "inquiry", "food safety", and "manufacturing and distribution" as the utilization applications, the accuracy of information is visualized, and the customer reviews are displayed in association with the importance of the information. With this configuration, anyone can extract the classified customer reviews by a simple operation. This makes it easy to perform data analysis according to the purpose. The utilization application of customer reviews is merely one example of the criteria. In another example, data is classified based on any other suitable criteria.

A detailed description is now given of an example in which data is classified based on the utilization application. FIG. 17 is a schematic diagram illustrating an overview of a quality analysis service in the food industry using the data processing system. A capturing device 80 is a device such as a PC or a headset used by an operator who receives customer reviews. The server 10 is performs processing of analyzing and classifying data acquired from the capturing device 80 and associating importance with the data. The operation device 11 is provided in each of departments that handles the classified data.

A customer who purchased a food manufactured and sold by a certain company answers a questionnaire about the purchased food, share information on the purchased food through a social networking service (SNS), or makes a complaint over a telephone. These customer reviews are useful information for product development, quality assurance, product manufacturing and delivery, etc. Companies include a marketing department and/or a product planning department that handle information useful for product development, a quality assurance department and a customer service department that handle information useful for product assurance, and a manufacturing department and a logistics department that handle information useful for manufacturing and delivery of products.

Since customer reviews are collectively received by an operator, the received customer reviews are to be classified to data items corresponding to the departments respectively. The server 10 analyzes and classifies the data transmitted from the capturing device 80 using AI, generates a list that associates the data with importance. Further, the server 10 transmits the list to the operation devices 11 provided in the departments respectively, to cause the operation devices to display the list. Associating the data with importance in the form of list makes it possible to immediately recognize what kind of issue is present as a significant issue to be addressed in terms of food safety, and to use such information to improve quality.

The capturing device 80 collectively uploads the customer reviews to the server 10. The data to be uploaded is, for example, in a format of a comma separated values (CSV) file, which is a text file in which values and items are separated by commas. The AI is a learned AI that is already learned by using training data, and usable now without keyword registration. The AI interprets context of text data included in the data and classifies the text data into a type and a category to which the text data corresponds. The AI predicts and suggests related words to be concerned about in response to an input of a keyword. With this configuration, the server 10 organizes significant information in the form of list and transmits the list to the operation device information to the operation device 11, to cause the operation device to display the classification result.

Examples of the types of data include, but are not limited to, "inquiry", which relates to product development, "food safety", which relates to quality assurance, and "manufacturing and distribution", which relates to product manufacturing and delivery. Examples of categories to which "inquiry" is classified include "praise/encouragement", "request/proposal", "query/consultation", and "pointed-out issue/complaint". For example, an inquiry such as "I want to take it out quickly," "I want to prevent overdrinking," or "I want to drink up," is identified from its context that includes the terms "want to", which relates to request. Accordingly, such inquiry is classified into the category of "request/proposal". In response to this request, the marketing department and/or the product planning department plans to provide the product as a small amount pack and proposes the plan. As a result, the company can recognize a major trend of customers and extract requests and proposals, to utilize them for strategic marketing activities.

Examples of categories to which the "food safety" is classified include "digestive symptoms", "headache/fever", "skin symptoms such as rash", "constipation", "oral and throat symptoms", "ambiguous symptoms", "symptoms of other parts", and "no health damage". For example, contents of reviews such as "I have audible bowel sounds when I drink the product", "Recently, my abdominal health is not good", "I am more likely to have diarrhea" are analyzed and identified as indigestion. Accordingly, such reviews are classified to a category of the "digestive symptoms". The quality assurance department and/or the customer service department detect such state and check the quality of the product. Thus, quality problems are extracted thoroughly and appropriate feedback is performed.

Examples of categories to which the "manufacturing and distribution" is classified include, but are not limited to, "foreign matter contamination", "abnormal odors/taste deterioration", "container damage/packaging box deformation", "expiration date and allergen labelling defect", and "others". For example, contents of reviews such as "The box was dented", "I want to return the product because it is full of scratches", "Packing condition is terrible. Is the contents okay?" are analyzed and identified as a complaint about a container or a package. Accordingly, such reviews are classified to a category of "container damage/packaging box deformation". The manufacturing department and the logistics department checks the state of containers or packages in response to such complaints. Thus, quality problems are thoroughly fed back without personal bias.

FIG. 18 is a diagram illustrating an example of a screen on which the classification result is displayed at the operation device 11. The screen includes a filed 90 indicating the types of data and a filed 91 indicating the category, the importance, etc. The field 90 lists three types of data, i.e., "inquiry", "food safety", and "manufacturing and distribution". FIG. 18 illustrates an example in which the "food safety" is currently selected.

The field 91 includes a content 92 of data, an analysis date 93 of data, a category 94, accuracy 95, and importance 96. In one example, the content 92 of data is entire content of text included in the data. In another example, the content is a text portion relating only to food safety. In another example, the content is a summary. In the content 92 of data, specific information extracted at a time when data is classified into the categories is displayed in a different color or highlighted, for example, so that the specific information is distinguished from other portions.

When data is image data or audio data, a content text converted from the data is displayed. In another example, address information such as a path name or a uniform resource locator (URL) indicating a storage location of the image data before the conversion into text, a thumbnail of the image data before the conversion into text, and/or a voice mark 97 are displayed in addition to the content of data. This makes it possible to compare characters in an image or sounds with the text converted from the data converted, to check whether the data is accurately converted into text. In the example of FIG. 18, the voice mark 97 is displayed, and voice data is reproduced in response to clicking the voice mark 97 with a mouse, for example.

The accuracy 95 is an index indicating a degree of accuracy with which text is classified to the corresponding category as a result of analysis by AI that performs natural language processing. The accuracy 95 can be represented by a degree of certainty. The closer to 1, the higher the degree of certainty.

The importance 96 is an index indicating a degree of health damage recognized from the content of data. The importance 96 is expressed in, for example, three levels. Level 1 is a level at which there is no health damage. Examples of the level 1 include, but are not limited to, a damage to a container, where one does not have to see a doctor. Level 2 is a level at which there is minor health damage. Examples of the level 2 include, but are not limited, a case in which one's tooth is chipped, where one sees a doctor at his/her discretion. Level 3 is a level at which there is health damage. Examples of the level 2 include, but are not limited to, diarrhea and vomiting, where one has to see a doctor. The three levels are merely examples of the importance 96. In another example, the importance is represented by two levels. In still another example, the importance is represented by four or more levels.

Also, when the "manufacturing and distribution" is selected in the field 90, the importance 96 is regarded as an index indicating the degree of health damage is expressed in three levels, for example. By contrast, when the "inquiry" is selected, since the content does not relate to health damage, the importance 96 is not displayed.

A number 98 such as a data number is associated with the content 92 of data in the field 91. Accordingly, each content 92 us identified by the number 98. Although FIG. 18 illustrates an example in which the field 90 and the field 91 are displayed separately, in another example, only the classification result is displayed. Further, in FIG. 18, the field 91 includes the content 92 of the data, the analysis date 93 of the data, the category 94, the accuracy 95, and the importance 96, this is merely one example. In another example, in the field 91, only the content 92 of the data is displayed. In still another example, only the content 92 of the data and the storage destination of the data are displayed. In still another example, only one of the accuracy 95 and the importance 96 is displayed, in addition to the content 92 of the data.

Figure 19:
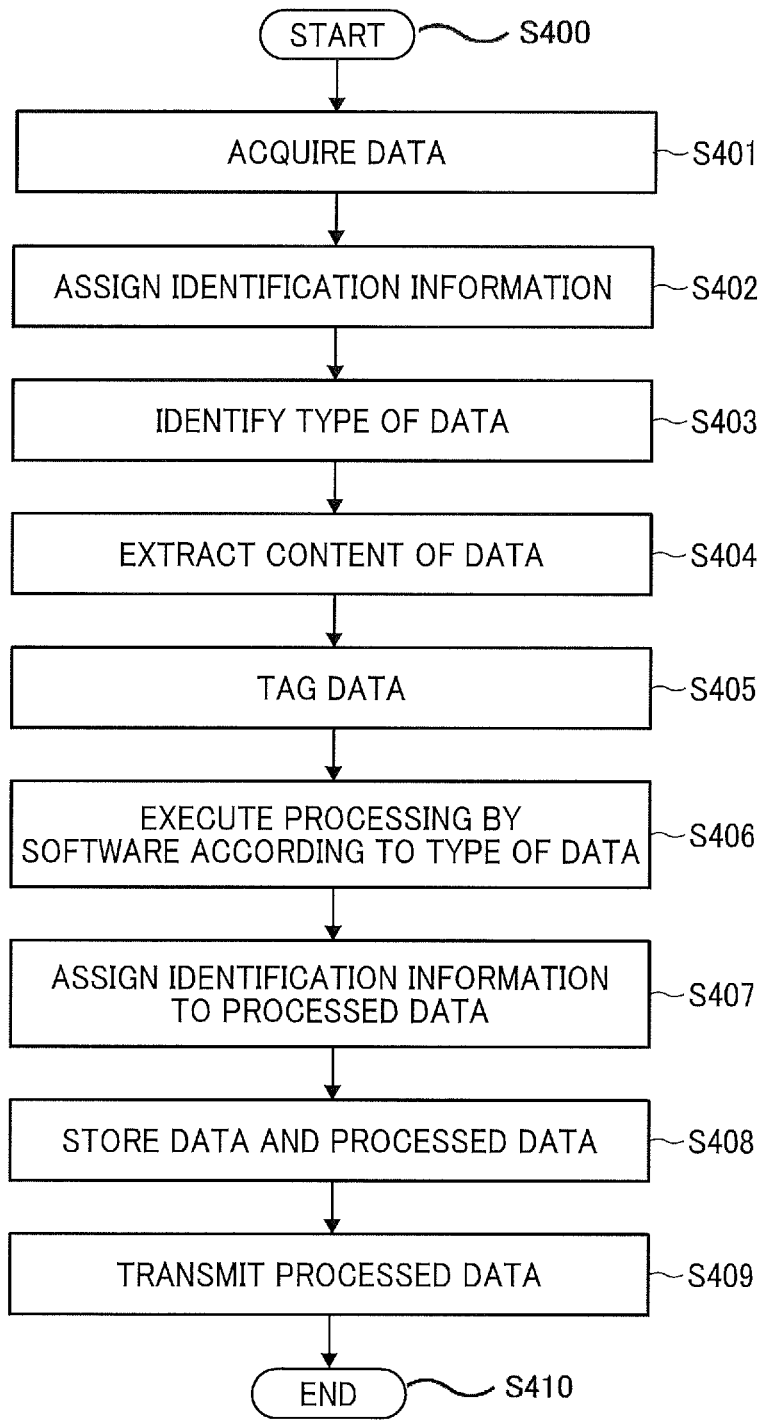
FIG. 19 is a flowchart illustrating steps in an operation performed by a server from acquisition of data to display of a classification result, according to an embodiment of the present disclosure.

FIG. 19 is a flowchart illustrating steps in an operation performed by the server 10 from acquisition of data to display of the classification result. The operation starts in step S400 in response to acquisition of data by the capturing device 80 and transmission of the acquired data to the server 10. In step S401, the reception unit 50 receives and acquires the data transmitted from the capturing device 80. The data may be image data or voice data. The image data is converted into text by OCR. The voice data is converted into text by speech recognition.

In step S402, the association unit 51 assigns identification information to the acquired data. In step S403, the identification unit 52 identifies a type of the data from text data included in the data. The type of data is identified by reading content of text included in the data using AI. The association unit 51 tags the data with the information on the type identified by the identification unit 52 as a tag. The tag includes, for example, the "inquiry", the "food safety", and the "manufacturing and distribution".

In step S404, the extraction unit 53 extracts specific information from the text data included in the data. The specific information is a content of a portion in the text data illustrated in FIG. 18 that is displayed in a manner that the information is distinguished from other portions. Since words or sentences to be extracted as containing a particular word are learned in advance by machine learning, the content including such words or sentences is extracted.

In step S405, the identification unit 52 identifies a category of the data based on the extracted content. The association unit 51 tags the data with the information on the category identified by the identification unit 52 as a tag. For the data classified into the type "inquiry", the tag is, for example, any one of "praise/encouragement", "request/proposal", "query/consultation", and "pointed-out issue/complaint". For the data classified into the type "food safety", the tag is, for example, any one of "digestive symptoms", "headache/fever", "skin symptoms such as rash", "constipation", "oral and throat symptoms", "ambiguous symptoms", "symptoms of other parts", and "no health damage". For the data classified into the type "manufacturing and distribution", the tag is, for example, any one of "foreign matter contamination", "abnormal odors/taste deterioration", "container damage/packaging box deformation", "expiration date and allergen labelling defect", and "others".

In step S406, the execution unit 54 executes one or more processes by one or more software according to the type of data. The process includes classifying data and automatically determining accuracy and importance. The data is classified based on the identified tag. The information accuracy and the importance of the data using AI. The processed data is associated with the content of data, the analysis date, the accuracy, and the importance.

In step S407, the association unit 51 assigns identification information to processed data, which is obtained by executing one or more processes by the execution unit 54. The identification information is, for example, the number 98. Thus, the original data and the processed data are associated with each other. Further, the association unit 51 can assign, to these data items, information relating to software that has executed one or more processes. The information relating to software is, for example, a software name.

In step S408, the storage unit 55 stores the processed data associated with the original data. By thus storing the original data and the processed data in association with each other, the processed data can be acquired at a timing required by a user. In step S409, in response to a request from the operation device 11, the control unit 56 acquires the processed data from the storage unit 55 based on the type, and generates a list based on the acquired data. The transmission unit 57 transmits the classification result of the data in the form of list to the operation device 11. The operation device 11 receives and displays the classification result of the data in the form of list. The classification result includes, for example, the analysis date, the accuracy, the importance, image data, and audio data. The operation device 11 may perform a part of the processing by the control unit 56 of the server 10. For example, the operation devicell receives the analysis date, the accuracy, the importance, and at least one of the image data and the audio data, generates screen data using all or a part of these received data items, and displays the classification result of the data in the form of list. After the transmission of the classification result, the operation ends in step S410. The image data is indicated by the address information or the thumbnail, for example. The audio data is indicated by the voice mark 97.

According to one or more embodiments, a non-transitory computer-executable medium storing a program storing instructions is provided, which, when executed by one or more processors of a data processing apparatus, causes the one or more processor to a method of processing data. The method includes acquiring data. The method includes identifying a type of the data based on one of text information included in the data and text information converted from the data. The method includes executing one or more processes on the data according to the identified type. The method includes performing control to output one or more pieces of processed data, which is data obtained by executing the one or more processes, as one or more processing results.

The related art only adds attribute information to data and stores the data to which the attribute information is added.

According to one or more embodiments of the present disclosure, one or more processes are performed on data according to an identified type of the data.

As described, according to one or more embodiments of the present disclosure, at a time when data is acquired, software associated with the acquired data is executed. Processed data, which is data obtained by executing the software on the acquired data is stored. In response to selecting data by a user at a desired timing, the processed data is displayed. Further, by selecting software, the registered data is automatically displayed, processing such as analysis of the data is executed. Thus, the processed data is displayed without designating processing and executing the processing on the data. Further, the processed data is subjected to an additional workflow. This simplifies an operation to be performed on data by a user.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A data processing apparatus comprising circuitry configured to:
   acquire data;
   identify a type of the data based on text information of the data, the text information being one of text information included in the data and text information converted from the data, the type being classified into categories;
   identify a category of the data from the categories in the type based on the text information;
   execute one or more processes on the data to obtain one or more pieces of processed data, the one or more processes including analyzing importance of the data according to the identified type, the identified category and the text information, the importance of the data indicating a degree of necessity of taking a predetermined step recognized from the identified type, the identified category and the text information, and being expressed in a plurality of levels;

perform control to associate the one or more pieces of processed data with the importance of the data;

output the one or more pieces of processed data to display as one or more processing results in which the identified type, the identified category and the text information are associated with an analyzing result of the importance of the data; and determine whether or not the predetermined step needs to be taken in the identified type, wherein the importance of the data is not displayed in a case where the circuitry determines that the predetermined step does not need to be taken in the identified type.

2. The data processing apparatus of claim 1, wherein the circuitry is further configured to extract a content of a designated item from the data based on the text information, and execute the one or more processes based on the extracted content.

3. The data processing apparatus of claim 1, wherein the circuitry is further configured to store the acquired data in association with the one or more pieces of processed data, and instruct an operation device to output a list of the data stored, the operation device being operated by a user.

4. The data processing apparatus of claim 1, wherein the circuitry is further configured to convert the data into text data according to the acquired data.

5. The data processing apparatus of claim 4, wherein the circuitry is further configured to convert the data into the text data by speech recognition in a case that the data is voice data, and convert the data into the text data by character recognition in a case that the data is image data.

6. The data processing apparatus of claim 1, wherein the circuitry is further configured to classify the one or more pieces of processed data, execute processing of analyzing accuracy of a classification result of the one or more pieces of processed data, and output the classification result, the accuracy, and the importance as the one or more processing results.

7. The data processing apparatus of claim 6, wherein in a case that the data is one of image data and voice data, the processing result that is output includes the one of the image data and the voice data.

8. The data processing apparatus of claim 1, wherein the circuitry is further configured to acquire user identification information identifying a user, and execute the one or more processes on the data according to the identified type and the acquired user identification information.

9. The data processing apparatus of claim 8, wherein the circuitry is further configured to receive, as an instruction from the user, selection of one piece of data by the user, and control an output of the one or more pieces of processed data associated with the selected one piece of data.

10. The data processing apparatus of claim 9, wherein the circuitry is further configured to perform control to output at least one of a list of the one or more pieces of processed data or a list of other processes different from the one or more processes that are executed according to a type of the one or more processes executed on the one or more pieces of processed data associated with the selected one piece of data.

11. The data processing apparatus of claim 10, wherein the circuitry is further configured to receive, as the instruction from the user, selection of one of the one or more pieces of processed data from the list of the one or more pieces of processed data, and control an operation device to output the selected one of the one or more pieces of processed data, the operation device being operated by a user.

12. The data processing apparatus of claim 10, wherein the circuitry is further configured to receive, as the instruction from the user, selection of one process from the list of other processes, and output as data to be used for the selected one process to an operation device.

13. The data processing apparatus of claim 11, wherein the operation device displays, as the one or more processing results, a classification result based on specific information included in the text information as category information.

14. The data processing apparatus of claim 13, wherein the circuitry controls the operation device to display content of the data including the specific information.

15. The data processing apparatus of claim 14, wherein the circuitry controls the operation device to display the specific information included in the text information in a manner that the specific information is distinguished.

16. The data processing apparatus of claim 14, wherein the circuitry controls the operation device to display content of the data and information indicating a storage destination of the data acquired.

17. A data processing system comprising:

a data processing apparatus; and an operation device, the data processing apparatus including circuitry configured to:

acquire data;

identify a type of the data based on text information of the data, the text information being one of text information included in the data and text information converted from the data, the type being classified into categories;

identify a category of the data from the categories in the type based on the text information;

execute one or more processes on the data to obtain one or more pieces of processed data, the one or more processes including analyzing importance of the data according to the identified type, the identified category and the text information, the importance of the data indicating a degree of necessity of taking a predetermined step recognized from the identified type, the identified category and the text information, and being expressed in a plurality of levels;

perform control to associate the one or more pieces of processed data with the importance of the data;

output the one or more pieces of processed data to display as one or more processing results in which the identified type, the identified category and the text information are associated with an analyzing result of the importance of the data; and determine whether or not the predetermined step needs to be taken in the identified type, wherein the importance of the data is not displayed in a case where the circuitry determines that the predetermined step does not need to be taken in the identified type.

18. A method of processing data by a data processing apparatus, comprising:

acquiring data;

identifying a type of the data based on text information of the data, the text information being one of text information included in the data and text information converted from the data, the type being classified into categories;

identifying a category of the data from the categories in the type based on the text information;

executing one or more processes on the data to obtain one or more pieces of processed data, the one or more processes including analyzing importance of the data according to the identified type, the identified category and the text information, the importance of the data indicating a degree of necessity of taking a predetermined step recognized from the identified type, the identified category and the text information, and being expressed in a plurality of levels;

performing control to associate the one or more pieces of processed data with the importance of the data;

outputting the one or more pieces of processed data to display as one or more processing results in which the identified type, the identified category and the text information are associated with an analyzing result of the importance of the data; and determining whether or not the predetermined step needs to be taken in the identified type, wherein the importance of the data is not displayed in a case of determining that the predetermined step does not need to be taken in the identified type.

19. The data processing apparatus of claim 1, wherein the importance of the data is displayed in numerical values as one or more processing results.

* * * * *